(12) United States Patent
Hozumi et al.

(10) Patent No.: US 6,587,281 B2
(45) Date of Patent: Jul. 1, 2003

(54) ZOOM IMAGE PICKUP OPTICAL SYSTEM

(75) Inventors: Kouki Hozumi, Hachioji (JP); Yuji Miyauchi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/878,177

(22) Filed: Jun. 12, 2001

(65) Prior Publication Data
US 2002/0034019 A1 Mar. 21, 2002

(30) Foreign Application Priority Data
Jun. 12, 2000 (JP) .................................... 2000-174847

(51) Int. Cl.[7] ............................................... G02B 15/14
(52) U.S. Cl. ........................................ 359/687; 359/686
(58) Field of Search .................................. 359/686, 687

(56) References Cited

U.S. PATENT DOCUMENTS

2002/0034019 A1 * 3/2002 Hozumi et al. ............. 359/687

FOREIGN PATENT DOCUMENTS

| JP | 04043311 A | 2/1992 |
|---|---|---|
| JP | 05072474 A | 3/1993 |
| JP | 59-013212 | 1/1994 |
| JP | 06094997 A | 4/1994 |
| JP | 06347697 A | 12/1994 |
| JP | 07199069 A | 8/1995 |
| JP | 08-094931 | 4/1996 |
| JP | 08-179206 | 7/1996 |
| JP | 08-271787 | 10/1996 |

* cited by examiner

Primary Examiner—Georgia Epps
Assistant Examiner—David N. Spector
(74) Attorney, Agent, or Firm—Pillsbury Winthrop LLP

(57) ABSTRACT

A zoom image pickup optical system including, in order from the object side, a first lens unit having positive refractive power, a second lens unit having negative refractive power, a third lens unit having positive refractive power and a fourth lens unit having positive refractive power, in which at least the second lens unit and the fourth lens units are moved along an optical axis to change a magnification, in which the third lens unit includes at least two lens components, in which the fourth lens unit includes at least two lens components, and in which radii of curvature on at least one or pairs of surfaces of the third lens unit and the fourth lens unit such as an image side surface of a most image side lens component in the third lens unit and an object side surface of a most object side lens component in the fourth lens unit which correspond to each other with regard to an airspace between the third lens unit and the fourth lens unit have different signs.

25 Claims, 10 Drawing Sheets

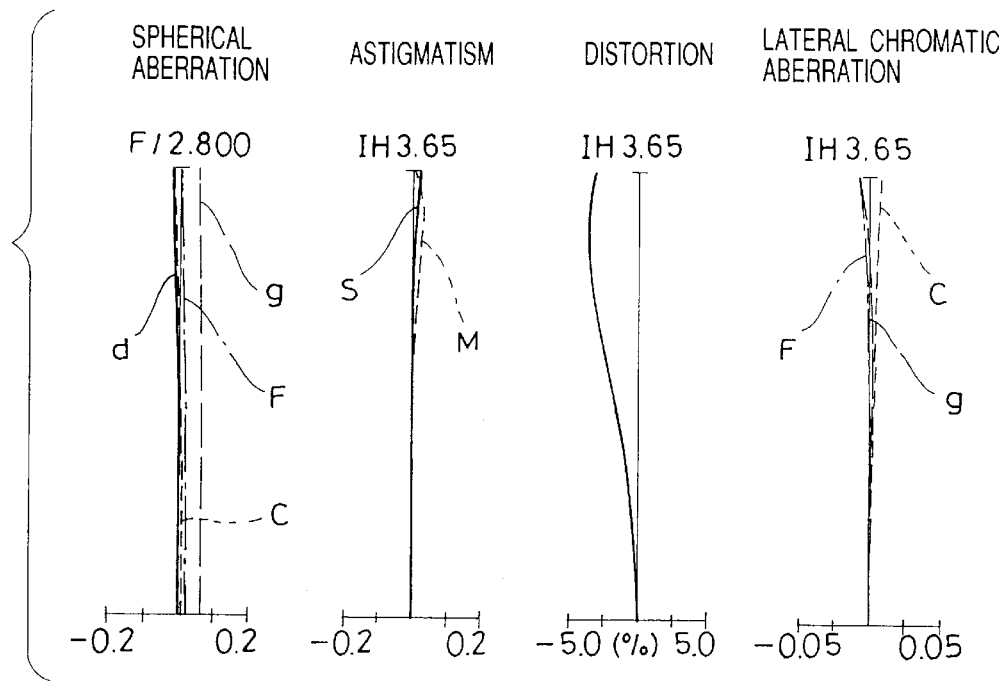
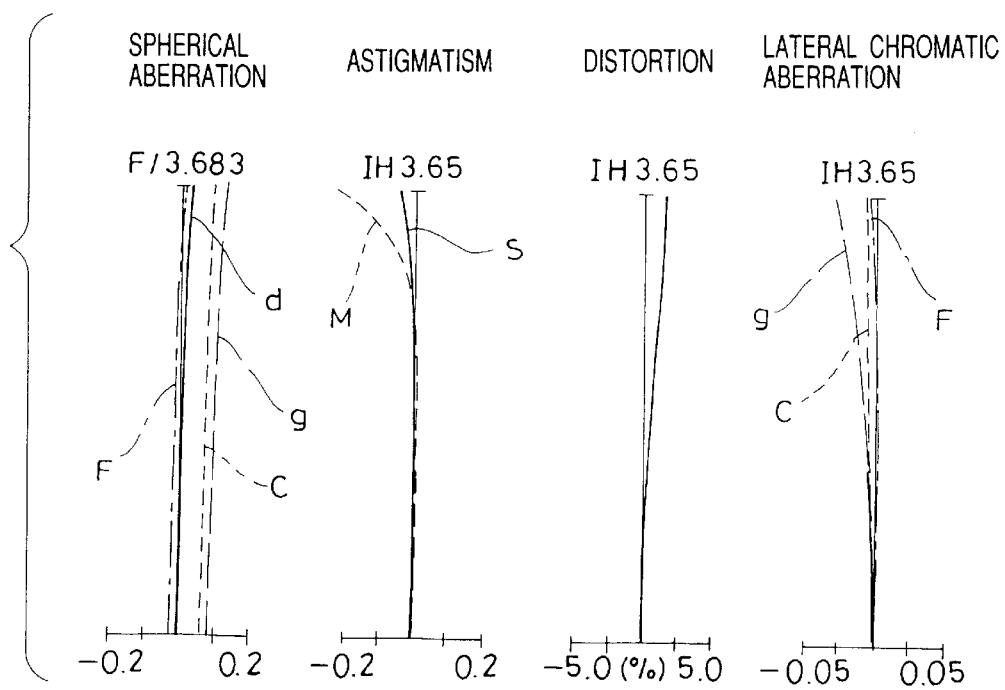

ZOOM IMAGE PICKUP OPTICAL SYSTEM

BACKGROUND OF THE INVENTION a) Field of the Invention

The present invention relates to a zoom lens system and more specifically a zoom image pickup optical system which in compact, forms a high quality image, can be manufactured at a low cost and is to be used with a camera using electronic image pickup means such as a cam coder, digital camera or the like.

b) Description of the Prior Art

In this field, a zoom optical system disclosed by Japanese Patent Kokai Publication No. Hei 6-94997 is known as a conventional example of zoom optical system which has a high vari-focal ratio on the order of 10, is compact and can be manufactured at a low cost. The zoom optical system mentioned as this conventional example consists, in order from the object side, of a first lens unit which has positive refractive power and is kept stationary during a magnification change, a second lens unit which has negative refractive power and is moved from the object side on the image side to change a magnification from a wide position to a tele position, a third lens unit which has positive refractive power and is moved from the image side on the object side to change the magnification from the wide position to the tele position, and a fourth lens unit which has positive refractive power and is movable during the magnification change. That is, this zoom optical system has a configuration which shares a vari-focal function between the second lens unit and the third lens unit, and corrects a variation of an image surface caused due to the magnification change by moving the fourth lens unit, thereby allowing the zoom optical system to be compact.

Known as another conventional examples are optical system disclosed by Japanese Patents Kokai Publication No. Hei 5-72474 and No. Hei 8-271787 and No. Hei 4-43311 each of which consists of as first lens unit having positive refractive power, a second lens unit having negative refractive power, a third lens unit having positive refractive power and a fourth lens unit having positive refractive power, the third lens unit being kept stationary during a magnification change and the other lens units being movable.

Furthermore, zoom optical systems disclosed by Japanese Patents Kokai Publication No. Hei 8-94931. No. Hei 7-199069 and No. Hei 8-179206 are known as other conventional examples of optical system wherein a fourth lens unit is kept stationary and other lens units are movable during a magnification change.

Furthermore, there is a conventional example of zoom optical system disclosed by Japanese Patent Kokai Publication No. Sho 59-13212 which has a vari-focal ratio on the order of 5, and consists of first lens unit, a second lens unit and a third lens unit which are movable for a magnification change and a fourth lens unit which is kept stationary during the magnification change and has a contrived composition.

In recent years where electronic an image pickup device has a large number of picture elements, and only compactness and a low manufacturing cost but also a capability to form a high quality image is demanded for a photographic optical system.

In order to obtain a high quality image, it is required for an optical system not only to enhance contrast and resolution but also to correct chromatic aberration favorably over an entire object distance range. Furthermore, it is required for an optical system to have an F value providing pretty brightness while reserving a required amount of marginal rays.

It cannot be said that the above-mentioned conventional examples can provide images of qualities favorable sufficiently for an electronic image pickup device which has more than 2 million picture elements or an electronic image pickup device on which picture elements are arranged at a pitch narrower than 3.8 µm. Furthermore, it cannot be said that the above mentioned conventional examples are compact and can be manufactured at low costs or high in productivities.

SUMMARY OF THE INVENTION

An object of the present invention is to provide a zoom image pickup optical system comprising, in order from the object side, a first lens unit having positive refractive power, a second lens unit having negative refractive power, a third lens unit having positive refractive power and a fourth lens unit having positive refractive power, wherein at least the second lens unit and the third lens unit are moved along an optical axis to change a magnification, wherein the third lens unit has at least two lens components, wherein the fourth lens unit has at least two lens components, and wherein $R_{3r1}$ has a sign different from that of $R_{4f1}$, $R_{3r2}$ has a sign different from that of $R_{4f2}$, $R_{3r3}$ has a sign different from that of $R_{4f3}$ and $R_{3r4}$ has a sign different from that of $R_{4f4}$ when a radius of curvature on an image side surface of a most image side lens component of the third lens unit and a radius of curvature on an object side surface of the third lens unit are represented by $R_{3r1}$ and $R_{3r2}$ respectively, a radius of curvature on an image side surface and an object side surface of a lens component which is adjacent to the most image side lens component of the third lens unit with an airspace interposed are designated by $R_{3r3}$ and $R_{3r4}$ respectively, a radius of curvature on an object side surface and a radius of curvature on an image side surface of a most object side lens component of the fourth lens unit are denoted by $R_{4f1}$ and $R_{4f2}$ respectively, and radius of curvature on an object side surface and a radius of curvature on an image side surface of an image side lens component which is adjacent to a most object side lens component with an airspace interposed are represented by $R_{4f3}$ and $R_{3r4}$ respectively.

Another object of the present invention is to provide a zoom optical system comprising, in order from the object side, a first lens unit having positive refractive power, a second lens unit having negative refractive power, a third lens unit having positive refractive power and a fourth lens unit having positive refractive power, wherein at least the second lens unit and the fourth lens unit are moved along an optical axis to change a magnification, wherein the third lens unit consists, in order from the object side, a front subunit and a rear subunit, wherein the fourth lens unit consists, in order from the object side, a front subunit and a rear subunit, wherein the rear subunit of the third lens unit and the front subunit of the fourth ions unit and lens components which have concave surface opposed to each other, wherein either of the rear subunit of the third lens unit and the front subunit of the fourth lens unit is a meniscus cemented lens component, a cemented lens component having negative refractive power or a single meniscus lens element having negative refractive power, wherein a radius of curvature $R_{5r1}$ on an image side surface of the lens component used as the rear subunit of the third lens unit has a sign different from that of a radius of curvature $R_{4r1}$ on an object side surface of the front subunit of the fourth lens unit, and wherein a radius of curvature $R_{3r2}$ on an object side surface of the lens component used as the rear subunit of the third lens unit has a sign different from that of a radius of curvature on an image side surface of the front subunit of the fourth lens unit.

Another object of the present invention is to provide a zoom image pickup optical system comprising, in order from the object side, a first lens unit having positive refractive power, a second lens unit having negative refractive power, a third lens unit having positive refractive power and a fourth lens unit having positive refractive power, wherein at least the second lens unit and the fourth lens unit are moved along an optical axis to change a magnification, wherein the third lens unit has at least two lens components, wherein the fourth lens unit consists of four or fewer lens elements including, in order from the object side, a front subunit consisting of a lens component which has a concave surface on the object side and a rear subunit consisting of one or more lens components, and wherein the front subunit of the fourth lens unit is a meniscus cemented lens component, a cemented lens component having negative refractive power or a single negative meniscus lens element.

Still another object of the present invention is to provide a zoom image pickup optical system comprising, in order from the object side, a first lens unit having positive refractive power, a second ions unit having negative refractive power, a third lens unit having positive refractive power and a fourth lens unit having positive refractive power, wherein at least the second lens unit and the fourth lens unit are moved along an optical axis to change a magnification, and wherein the fourth lens unit consists of a lens element which has aspherical surfaces on both sides: the object side surface having an aspherical surface which changes refractive power in a negative direction as portions of the aspherical surface are farther from the optical axis toward marginal portions.

Further another object of the present invention is to provide a zoom image pickup optical system comprising, in order from the object side, a first lens unit having positive refractive power, a second lens unit having negative refractive power, a third lens unit having positive refractive power and a fourth lens unit having positive refractive power, wherein at least the second lens unit and the fourth lens unit are moved along an optical axis to change a magnification, and wherein refractive indices of all lens elements which compose the optical system are 1.6 or higher.

BRIEF DESCRIPTION OF THE DRAWINGS

FIG. 9 shows curves illustrating aberration characteristics at a wide position of the first embodiment of the present invention;

FIG. 10 shows curves illustrating aberration characteristics at a tele position of the first embodiment of the present invention;

DETAILED DESCRIPTION OF THE PREFERRED EMBODIMENTS

Figure 1:
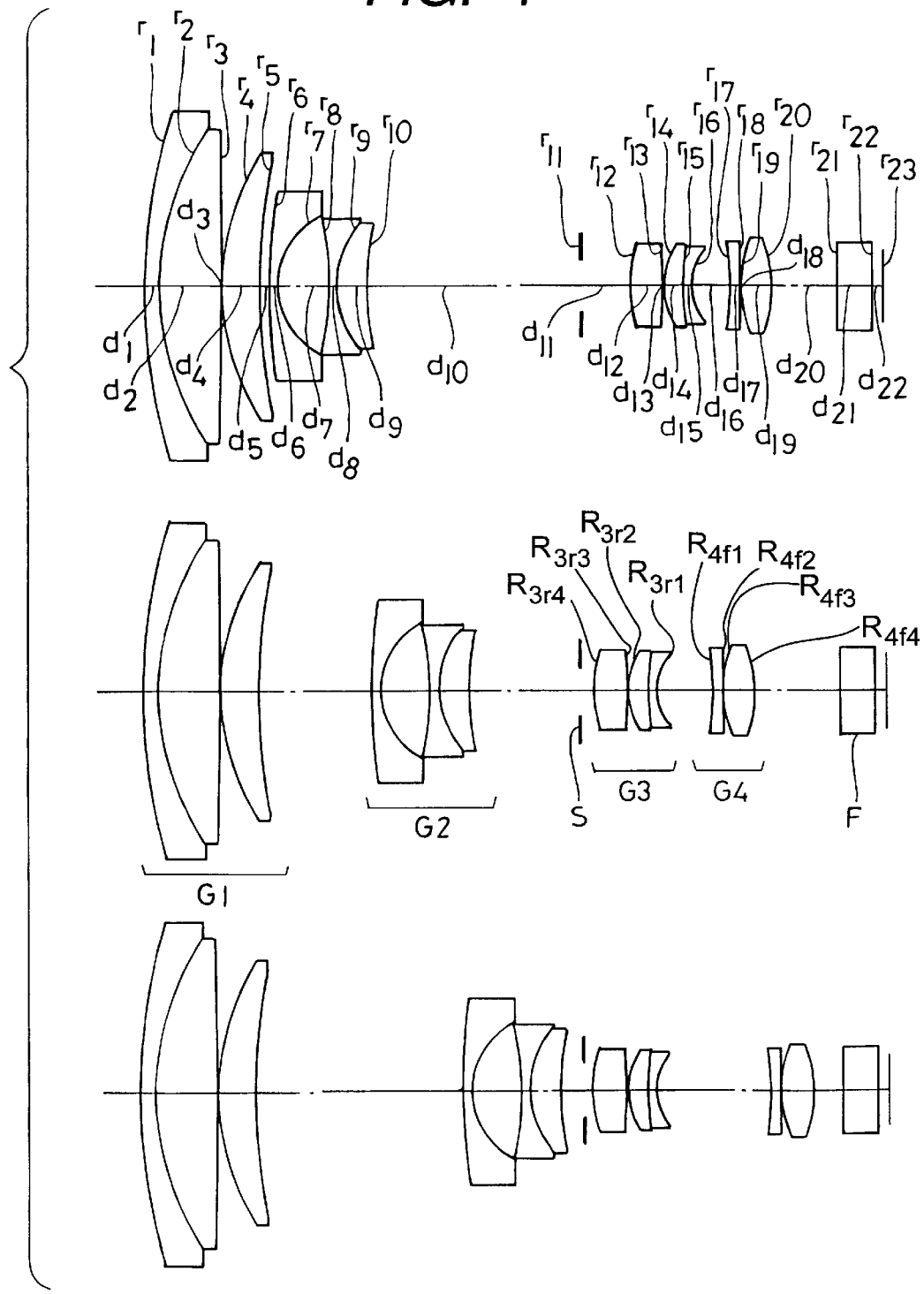
FIG. 1 is a sectional view showing a composition of a first embodiment of the present invention.

The zoom image pickup optical system according to the present invention (first composition) is an optical system characterized in that the optical system comprises, in order from the object side, a first lens unit having positive refractive power, a second lens unit having negative refractive power, a third lens unit having positive refractive power and a fourth lens unit having positive refractive power, that at least the second lens unit and the fourth lens unit are moved along an optical axis to change a magnification, that each of the third lens unit and the fourth lens unit comprises at least two lens components, and that $R_{3r1}$ has a sign different from that of $R_{4f1}$, $R_{3r2}$ has a sign different from that of $R_{4f2}$, $R_{3r3}$ has a sign different from that of $R_{4f3}$, and $R_{3r1}$ has a sign different from that of $R_{4f4}$ when a radius of curvature on an image side surface of a most image side lens component of the third lens unit is represented by $R_{3r1}$, a radius of curvature on an object side surface of this lens component is designated by $R_{2r2}$, a radius of curvature on an image side surface of a lens component disposed right before (on the object side of) the lens component (a second lens component as counted from the image side) is denoted by $R_{3r3}$, a radius of curvature on an object side surface of the second lens component as counted from the image side is represented by $R_{3r4}$, a radius of curvature on an object side surface of a most image side lens component of the fourth lens unit is designated by $R_{4f1}$, a radius of curvature on an image side surface of the most object side lens component of the fourth lens unit is denoted by $R_{4f2}$, a radius of curvature on an object side surface of a lens component next to the most object side lens component of the fourth lens unit (a second lens component as counted from the object side) is represented by $R_{4f3}$, and a radius of curvature on an image side surface of the second lens component of the fourth lens unit is designated by $R_{4f4}$.

It is assumes here that the radii of curvature $R_{3r1}$, $R_{3r2}$, ... on these lens surfaces have a negative sign when the surface are concave on the object side on the optical axis or a positive sign when the surfaces are concave on the image side.

It is further assumed that a lens component is a lens element or a cemented lens component and that only a most object side surface and a most image side surface of the lens component are air contact surfaces.

When $R_{3r1}$ has the sign different from that of $R_{4f1}$, $R_{3r2}$ has the sign different from that of $R_{4f2}$, $R_{3r3}$ has the sign different from that of $R_{4f3}$ and $R_{3r4}$ has the sign different from that of $R_{4f4}$ in the third lens unit and the fourth lens unit as described above, the third lens unit and the fourth lens unit have shapes which are symmetrical with regard to an airspace between these lens units. When the third lens unit and the fourth lens units are configured as described above, it is possible to reduce axial aberrations and offaxial aberrations by cancelling the aberrations with each other between these lens units, thereby composing an image pickup optical system having high performance.

When the above described requirement is satisfied, each lens component has a sufficient paraxial function (a sufficient refracting function), thereby desirably making it possible to obtain an optical system which has a high zoom ratio, provides a high quality image and consists of a small number of lens components.

For the optical system which has the first composition, it is desirable that an object side lens element of the most object side lens component of the fourth lens unit in particular satisfies the following condition (1):

$$0.01 < ||(R_{411}/R_{412})|-1| \quad (1)$$

wherein a reference symbol $R_{411}$ represents a radius of curvature on an object side surface of the object side lens element of the most object side lens component of the fourth lens unit and a reference symbol $R_{412}$ designates a radius of curvature on an image side surface of the object side lens element of the most object side lens component.

In addition, $R_{411}$ is equal to $R_{4f1}$ and $R_{412}$ is equal to $R_{4f2}$ when the most object side lens component of the fourth lens unit consists of a lens element or $R_{412}$ represents a radius of curvature on a cemented surface when the most object side lens component is a cemented lens component.

When the above mentioned condition (1) is not satisfied, the most object side lens component (or the object side lens element when the lens component is a cemented lens component) of the fourth lens unit has a small share of a paraxial burden, thereby making it difficult to compose the third lens unit and the fourth lens unit of a small number of lens elements for obtaining an optical system which has a high zoom ratio and provides a high quality image. Furthermore, it is difficult to locate an exit pupil of the optical system at a far position.

For obtaining a higher quality image and locating the exit pupil at a farther position, it is effective to modify a lower limit of the condition (1) to 0.07. Furthermore, it is desirable to define an upper limit of the condition (1) as 2. That is, it is desirable to satisfy, in place of the condition (1), the following condition (1-1):

$$0.01 < ||(R_{411}/R_{412})|-1| < 2$$

$$\text{or } 0.07 < ||(R_{411}/R_{412})|-1|$$

$$\text{or } 0.07 < ||(R_{411}/R_{412})|-1| < 2 \quad (1\text{-}1)$$

Furthermore, it is more desirable to satisfy the following condition (1-2);

$$0.02 < ||(R_{411}/R_{412})|-1|$$

$$\text{or } 0.20 < ||(R_{411}/R_{412})|-1| < 2$$

$$\text{or } 0.20 < ||(R_{411}/R_{412})|-1| < 1.0 \quad (1\text{-}2)$$

For the zoom image pickup optical system having the first composition according to the present invention, it is preferable to configure surfaces of the third lens unit and the fourth lens unit which are opposed to each other as concave surfaces respectively.

When an image side surface of the third lens unit and an object side surface of the fourth lens unit are configured as concave surfaces respectively, the optical system has a composition similar to the so-called double Gauss type, thereby being capable of further reducing aberrations and locating the exit pupil at a far position while maintaining a short total length of the optical system.

Furthermore, it is desirable that the zoom image pickup optical system having the first composition according to the present invention satisfies the following condition (2):

$$0.01 < |f_4/f_{4s}| < 5 \quad (2)$$

wherein a reference symbol $f_{4s}$ represents a focal length of each lens element disposed in the fourth lens unit and a reference symbol $f_4$ designates a focal length of the fourth lens unit.

When the fourth lens unit uses a cemented lens component, the reference symbol $f_{4s}$ represents a focal length of each lens element or an Sth lens element as counted from the object side.

If a lower limit of 0.01 of the condition (2) is exceeded, each lens element of the fourth lens unit will have power too weak to exhibit an aberration correcting effect. If an upper limit of 5 of the condition (2) is exceeded, in contrast, each lens element will have too strong power, thereby producing aberrations in large amounts.

For an optical system which satisfies the above mentioned condition (2), it is preferable that surfaces of the third lens unit and the fourth lens unit which are opposed to each other are concave surfaces.

It is more desirable that the condition (2) has a lower limit of 0.1. It is much more desirable that the condition (2) has a lower limit of 0.2. It is more desirable that the condition (2) has an upper limit of 3. It is much more desirable that the condition (2) has an upper limit of 2.5.

It is more desirable to satisfy the above described condition. That is, it is more desirable that the zoom image pickup optical system having the first composition according to the present invention satisfies both the condition (1) and condition (2).

A zoom image pickup optical system having another second composition according to the present invention is an optical system characterized in that the optical system comprises, in order from the object side, a first lens unit having positive refractive power, a second lens unit having negative refractive power, a third lens unit having positive refractive power and a fourth lens unit having positive refractive power as described above, that at least the second lens unit and the fourth lens unit are moved along an optical axis to change a magnification, that the third lens unit consists, in order from the object side, a front subunit and a roar subunit, that the fourth lens unit consists, in order from the object side, a front subunit and a rear subunit, that the rear subunit of the third lens unit and the front subunit of the fourth lens unit are lens components which have concave surfaces opposed to each other, that the rear subunit of the third lens unit or the front subunit of the fourth lens unit is a meniscus cemented lens component, a cemented lens component having negative refractive power or a single negative meniscus lens element and that $R_{3r1}$ has a sign different from that of $R_{4f1}$ and $R_{3r2}$ has a sign different from that of $R_{4f2}$.

$R_{3r1}$, $R_{3f2}$, $R_{4f1}$ and $R_{4f2}$ are identical to $R_{3r1}$, $R_{3r2}$, $R_{4f1}$ and $R_{4f2}$ in the first composition, and represent radii of curvature on an image side surface and an object side surface of a most image side lens component of the third lens unit, and an object side surface and an image side surface of a most object side lens component of the fourth lens unit respectively.

When the surfaces of the third lens unit and the fourth lens unit which are the lens components opposed to each other are configured to have symmetrical shapes, the two lens components can reduce offaxial aberrations like a Gauss type by cancelling the aberrations between the two lens components, thereby enhancing optical performance. Furthermore, when the surfaces of the lens components which are opposed to each other are configured as the concave surfaces, aberrations are further reduced and an exit pupil can be located far while maintaining a short total length of the optical system.

Furthermore, chromatic aberration can be reduced when the lens components which are opposed to each other are configured as a cemented lens component. Furthermore, adverse influences due to manufacturing errors can be reduced by configuring the lens components as the cemented lens component.

When the above described lens components which are opposed to each other have negative refractive power, axial rays travel as if they sprang up from an optical axis before and after a cemented surface (are refracted in a direction away from the optical axis), whereby the rays are desirably apt to be subjected to aberration correcting functions not only by this cemented surface but also by lens surfaces of the third lens unit and the fourth lens unit.

Furthermore, aberrations can be corrected with a smaller number of lens elements when the opposed lens component is configured as a single negative meniscus lens element.

Furthermore, it is preferable for the optical system having the above described second composition to configure either or both of the rear subunit of the third lens unit and the front subunit of the fourth lens unit so as to have negative refractive power since such a configuration makes it possible to locate an exit pupil at a farther position.

Furthermore, it is preferable to configure either or both of the front subunit of the third lens unit and the rear subunit of the fourth lens unit so as to have positive refractive power since such a configuration makes it possible to correct aberrations while maintaining appropriate power of a third lens component and a fourth lens component by combining the lens components which are opposed to each other, that is, a positive lens components of the rear subunit of the third lens unit and the rear subunit of the fourth lens unit, that is, the front subunit of the third lens unit and the rear subunit of the fourth lens unit.

When either of the front subunit of the third lens unit and the rear subunit of the fourth lens unit is a single biconvex lens element or each of the front subunit of the third lens unit and the rear subunit of the fourth lens unit is a single biconvex lens element, these lens elements are used as the positive lens elements and these lens units are composed of a smallest number of lens elements, thereby being desirable for a compact configuration and lowering a manufacturing cost of the optical system.

Furthermore, it is effective for correction of paraxial aperture aberrations to use an aspherical surface on the biconvex single lens element of the third lens unit, and it is desirable to dispose a single biconvex lens element in the fourth lens unit and use an aspherical surface on this lens component since such an aspherical surface makes it possible to favorably correct offaxial aberrations and reduce variations of aberrations to be caused by focusing.

Furthermore, it is more desirable that the above described a single biconvex lens element has aspherical surfaces on both sides. That is, it is possible to further enhance aberration correcting performance without increasing a number of lens elements or enhancing a manufacturing cost by configuring the above described lens element so as to have two aspherical surfaces.

Though optical performance of the optical system is largely influenced due to a thickness error of the single biconvex lens element in the vicinity of a lens axis and an eccentricity between the lens surfaces when the single biconvex lens element is configured so as to have the two aspherical surfaces and exhibits effects of the aspherical surfaces, the aspherical surfaces can moderate a sensitivity to manufacturing errors of other lens components of the optical system (adverse influences on the optical performance of the optical system due to the manufacturing errors).

Furthermore, manufacturing a lens element with high precisions of a thickness in the vicinity of a lens axis and an eccentricity is easier than combining a plurality of parts with a high precision, thereby facilitating to judge a satisfactory lens component and prevent a loss due to improper manufacturing.

A zoom optical system having a third composition according to the present invention is an optical system characterized in that the optical system comprises, in order from the object side, a first lens unit having positive refractive power, a second lens unit having negative refractive power, a third lens unit having positive refractive power and a fourth lens unit having positive refractive power, that at least the second lens unit and the fourth lens unit are moved along an optical axis to change a magnification, that the third lens unit comprises at least two lens components, that the fourth lens unit comprises, a front subunit consisting of a lens component having a concave surface on the object side and a rear subunit consisting of at least a lens component or four or fewer lens elements as a whole, and that the front subunit is a meniscus cemented lens component, a cemented lens component having negative refractive power or a single negative meniscus lens element.

The zoom optical system having the third composition according to the present invention is configured to reduce aberrations to be produced in the third lens unit by disposing the at least two lens components in the third lens unit. In this case, it is desirable to dispose at least a positive lens component and a negative lens component in the third lens unit. That is, it is easy to control chromatic aberration and a location of a principal point when a positive lens component and a negative lens component.

In the zoom optical system having the third composition according to the present invention, the fourth lens unit consists of a front subunit and a rear subunit as described above, and the front subunit has a concave object side surface to reduce mainly offaxial aberrations. This composition of the fourth lens unit makes it possible to locate an exit pupil of the optical system at a far position while maintaining a short total length. When the front subunit is a cemented lens component, the subunit is capable of reducing chromatic aberration and adverse influences on the optical system due to manufacturing errors. Furthermore, it is more preferable to configure the front subunit so as to nave negative refractive power. That is, the front subunit which has negative refractive power makes it possible to locate a principal point of the fourth lens unit on the object side and reserve required total refractive power of the third lens unit and the fourth lens unit without strengthening refractive power of the third lens unit and refractive power of the fourth lens unit respectively.

Furthermore, aberrations can be corrected favorably with a small number of lens element when the front subunit of the fourth lens unit is composed of a single negative meniscus lens element.

For the optical system having the third composition, it is preferable to configure the front subunit of the fourth lens unit so as to have negative refractive power since the negative refractive power makes it possible to locate the exit pupil at a farther position.

Furthermore, it is preferable for the optical system having the third composition to configure the rear subunit of the third lens unit so as to have positive refractive power.

When the fourth lens unit consists of a front subunit which has negative or relatively weak refractive power and a rear subunit which has positive refractive power, it is preferably possible to favorably correct aberrations while maintaining refractive power of the fourth lens unit at an appropriate level. In this case, it is more preferable to compose the rear subunit of a biconvex lens component.

When the positive lens component of the rear subunit is composed of a single biconvex lens element, that is, when lens surfaces having positive refractive power are disposed on the object side and the image side of the lens component, power is shared between these two lens surfaces and the fourth lens unit can be composed of a minimum number of lens components while suppressing production of aberrations, whereby the optical system can be manufactured compact at a low cost.

Furthermore, it is preferable to dispose an aspherical surface on the above described a single biconvex lens element of the third lens unit since such an aspherical surface makes it possible to effectively correct axial aperture aberrations. Furthermore, an aspherical surface which is used on the single biconvex lens element of the fourth lens unit is capable of reducing offaxial aberrations and variations of aberrations to be caused by focusing.

Though the single biconvex lens element may have an aspherical surface or two aspherical surfaces, an aberration correcting capability can be further enhanced without increasing a number of aspherical lens components or enhancing a manufacturing cost when the biconvex lens component has two aspherical surfaces.

A zoom optical system having a fourth composition according to the present invention is an optical system characterized in that the optical system comprises, in order from the object side, a first lens unit having positive refractive power, a second lens unit having negative refractive power, a third lens unit having positive refractive power and a fourth lens unit having positive refractive power, that at least the second lens unit and the fourth lens unit are moved along an optical axis to change a magnification, and that the fourth lens unit consists of a lens component having two aspherical surfaces, an object side surface of which is an aspherical surface which varies power in a negative direction as portions of the aspherical surface are farther from the optical axis toward a margin.

When the object side surface of the fourth lens unit is the aspherical surface which varies power in the negative direction as the portions of the aspherical surface are farther from the optical axis toward the margin in the optical system having the fourth composition, the optical system is capable of favorably correcting aberrations while keeping an exit pupil at a far position. Furthermore, aberrations which cannot be corrected sufficiently with the object side surface can be corrected by configuring an image side surface of the fourth lens unit as an aspherical surface, whereby the optical system can be composed of a small number of lens elements it is more preferable that the aspherical lens component of the fourth lens unit is a biconvex lens component. Furthermore, it is more effective for correcting aberrations to configure the object side aspherical surface as an aspherical surface which varies positive power into negative power as the portions of the aspherical surface are farther from the optical axis toward the margin.

A zoom optical system having a fifth composition according to the present invention is an optical system characterized in that the optical system comprises a first lens unit having positive refractive power, a second lens unit having negative refractive power, a third lens unit having positive refractive power and a fourth lens unit having positive refractive power, that at least the second lens unit and the fourth lens unit are moved along an optical axis to change a magnification, and that all lens elements are made of glass materials which have refractive indices of 1.6 or higher.

When all the lens elements have the refractive indices which are 1.6 or higher in the zoom optical system according to the present invention as described above, it is possible to strengthen power of each lens unit and lower curvature on lens surfaces, thereby suppressing production of aberrations.

Furthermore, it is more desirable that all the lens elements have refractive indices which are 1.65 or higher and it is much more preferable that all the lens elements have refractive indices of 1.68 or higher which facilitate to correct aberrations.

For all the zoom optical system having the first through fifth compositions according to the present invention, it is preferable to keep the first lens unit stationary during focusing.

When the first lens unit is kept stationary during focusing, it is possible to prevent aberrations from being varied by focusing. Furthermore, it is more preferable to focus the optical system by moving the fourth lens unit.

Furthermore, a strongly convex surface which is disposed on a most object side of the first lens unit serves for allowing an offaxial light bundle to be incident at an angle close to a right angle and preventing aberrations of high orders from being produced, thereby facilitating to correct aberrations produced by the first lens unit with the second lens unit, the third lens unit and the fourth lens unit.

For the zoom optical system having any one of the above described compositions, it is preferable to keep the first lens unit having the positive refractive power stationary during a magnification change.

When the first lens unit is to be kept stationary during the magnification change, it is unnecessary to move the first lens unit which has a largest diameter, whereby an image pickup apparatus can have a simple composition, and the optical system can be manufactured compact at a low cost.

For the zoom optical system having any one of the above described compositions, it is also preferable to move the third lens unit to change the magnification. That is, the magnification can be changed by moving the second lens unit and the third lens unit, and the optical system can be configured compact when the second lens unit and the third lens unit are to be moved for the magnification change.

For the zoom optical system having the first, second or the third composition in particular, it is possible to impart a main aberration correcting function to either of the third lens unit and the fourth lens unit so that the optical system is capable of forming an image of a favorable quality even when the third lens unit has a vari-focal function.

When the second lens unit and the third lens unit have the vari-focal functions as described above in the optical system according to the present invention, it is desirable to change a magnification from a wide position to a tele position by moving the second lens unit monotonously from the object side on the image side and move the third lens unit monotonously from the image side on the object side such movements of the lens units are preferable from viewpoints of a lens barrel structure, a driving power distribution and the like.

The above described monotonous movement of the second lens unit from the object side on the image side and the monotonous movement of the third lens unit from the image side on the object aide for the magnification change from the wide position to tele position result in shortening of moving distances of the two lens units, thereby providing preferabilities from viewpoints of a lens barrel structure, a driving power distribution and the like.

For the zoom optical system having any one of the compositions according to the present invention, it is preferable to move the fourth lens unit along a moving locus which is convex on the object side, since such a locus permits shortening a moving distance of the fourth lens unit and allowing aberrations produced by the fourth lens unit to be varied less by zooming.

Furthermore, it is desirable to focus the optical system according to the present invention by moving the fourth lens unit.

In the optical system according to the present invention, a paraxial light bundle is incident on the fourth lens unit at a relatively small angle. Accordingly, it is preferable to focus the optical system by moving the fourth lens unit so that aberrations are varied little by focusing. Furthermore, the fourth lens unit has a relatively small diameter and is light in weight, thereby having a merit that this lens unit requires a low torque for focusing. The movement of the fourth lens unit is desirable for the optical system having the above described first or second composition in particular since paraxial and offaxial aberrations are varied little by moving the fourth lens unit for focusing, and an image of a favorable quality can be obtained when the optical system uses an image pickup device which has a large number of picture elements.

For all the optical system having all the compositions according to the present invention, it is desirable to fix stops during zooming.

Since it is necessary to change an aperture of a stop for exposure adjustment, the stop requires a driving mechanism for changing the aperture. It is desirable that this driving mechanism is disposed separately from a driving mechanism for zooming and focusing.

When the stop is fixed at a location, the driving mechanism for adjusting an aperture area can be simplified, whereby the fixed stop preferably serves for a compact, light weight configuration and lowering a manufacturing cost of the optical system. In this case, a driving source for the stop driving mechanism may be used commonly to a driving source for zooming and focusing.

Furthermore, it is preferable to dispose the stop between the second lens unit and the third lens unit for a balance among a location of an exit pupil, reduction of a diameter of a lens element disposed on the object side of the optical system and distortion. When a magnification is changed by moving the second lens unit and the third lens unit is particular, such a disposition of the stop is desirable since the location makes it possible to configure the optical system with a good balance and compact as a whole.

Furthermore, it is preferable that the optical system according to the present invention has a vari-focal ratio of 5 or higher.

When a vari-focal ratio is to be 5 or lower, it is possible to configure a compact optical system which provides a high quality image and can be manufactured at a low cost even if a composition is further simplified. When a vari-focal ratio is to be 5 or higher, on the other hand, it is possible to configure a compact optical system which can cope with a large number of picture elements, provide high quality image and nave high productivity when a vari-focal ratio is to be 8 to 15 in particular, an optical system can exhibit high optical performance.

Embodiments of the zoom image pickup optical system according to the present invention will be described below.

First through seventh embodiments of the zoom image pickup optical system according to the present invention have compositions shown in FIG. 1 through FIG. 7 and numerical data which is listed below:

Embodiment 1

$f = 5.864 \sim 15.901 \sim 58.871$, $F/2.80 \sim F/3.26 \sim F/3.68$
$2\omega = 60.92°$ (wide position), $6.36°$ (tele position)
CCD pitch: range of $4.2 \sim 3.2 \, \mu m$

| | | | | | | | |
|---|---|---|---|---|---|---|---|
| $r_1 =$ | 59.315 | | | | | | |
| | | $d_1 =$ | 1.42 | $n_1 =$ | 1.84666 | $\nu_1 =$ | 23.78 |
| $r_2 =$ | 27.477 | | | | | | |
| | | $d_2 =$ | 6.07 | $n_2 =$ | 1.67790 | $\nu_2 =$ | 55.34 |
| $r_3 =$ | −4021.223 | | | | | | |
| | | $d_3 =$ | 0.10 | | | | |
| $r_4 =$ | 24.395 | | | | | | |
| | | $d_4 =$ | 3.71 | $n_3 =$ | 1.72916 | $\nu_3 =$ | 54.68 |
| $r_5 =$ | 67.210 | | | | | | |
| | | $d_5 =$ | $D_1$ (variable) | | | | |
| $R_6 =$ | 60.579 | | | | | | |
| | | $d_6 =$ | 0.95 | $n_4 =$ | 1.80610 | $\nu_4 =$ | 40.92 |
| $r_7 =$ | 7.551 | | | | | | |
| | | $d_7 =$ | 4.92 | | | | |
| $r_8 =$ | −27.873 | | | | | | |
| | | $d_5 =$ | 0.85 | $n_5 =$ | 1.51633 | $\nu_5 =$ | 64.14 |
| $r_9 =$ | 9.394 | | | | | | |
| | | $d_9 =$ | 2.97 | $n_6 =$ | 1.84666 | $\nu_6 =$ | 23.78 |
| $r_{10} =$ | 30.690 | | | | | | |
| | | $d_{10} =$ | $D_2$ (variable) | | | | |
| $r_{11} =$ | stop | | | | | | |
| | | $d_{11} =$ | $D_3$ (variable) | | | | |
| $r_{12} =$ | 13.716 (aspherical surface) | | | | | | |
| | | $d_{12} =$ | 3.24 | $n_7 =$ | 1.69350 | $\nu_7 =$ | 53.20 |
| $r_{13} =$ | −220.124 | | | | | | |
| | | $d_{13} =$ | 0.10 | | | | |
| $R_{14} =$ | 6.966 | | | | | | |
| | | $d_{14} =$ | 2.00 | $n_8 =$ | 1.72342 | $\nu_8 =$ | 37.95 |
| $r_{15} =$ | 24.874 | | | | | | |
| | | $d_{15} =$ | 0.85 | $n_9 =$ | 1.84666 | $\nu_9 =$ | 23.78 |
| $r_{16} =$ | 5.372 | | | | | | |
| | | $d_{16} =$ | $D_4$ (variable) | | | | |
| $r_{17} =$ | −28.096 | | | | | | |
| | | $d_{17} =$ | 1.00 | $n_{10} =$ | 1.80518 | $\nu_{10} =$ | 25.42 |
| $r_{18} =$ | 105.630 | | | | | | |
| | | $d_{18} =$ | 0.10 | | | | |
| $r_{19} =$ | 9.700 (aspherical surface) | | | | | | |
| | | $d_{19} =$ | 3.11 | $n_{11} =$ | 1.58913 | $\nu_{11} =$ | 61.25 |
| $r_{20} =$ | −13.116 | | | | | | |
| | | $d_{20} =$ | $D_3$ (variable) | | | | |
| $R_{21} =$ | ∞ | | | | | | |
| | | $d_{21} =$ | 3.50 | $n_{12} =$ | 1.51633 | $\nu_{12} =$ | 64.14 |
| $r_{22} =$ | ∞ | | | | | | |
| | | $d_{22} =$ | 1.00 | | | | |
| $r_{23} =$ | ∞ (image) | | | | | | | aspherical surface coefficients (12th surface) $K = 1.416$, $A_4 = -1.02903 \times 10^{-4}$,
$A_6 = -4.90876 \times 10^{-7}$, $A_8 = -3.41834 \times 10^{-8}$
(19th surface) $K = 0.489$, $A_4 = -4.55746 \times 10^4$

| f | 5.864 | 15.901 | 58.871 |
|---|---|---|---|
| $D_1$ | 0.80 | 10.91 | 19.99 |
| $D_2$ | 20.94 | 10.77 | 2.20 |
| $D_3$ | 4.74 | 1.29 | 0.80 |
| $D_4$ | 3.75 | 5.42 | 11.17 |
| $D_5$ | 6.60 | 8.43 | 2.86 |

$R_{411} = -28.096$, $R_{412} = 105.63$, $f_{41} = -27.4713$, $f_{42} = 9.9682$,
$f_4 = 14.47757$, $\| (R_{411}/R_{412}) | -1 | = 0.734015$
$| f_4/f_{41} | = 0.527007$, $| f_4/f_{42} | = 1.452376$

-continued

Embodiment 2 f = 5.891~17.246~58.882, F/2.80~F/3.24~F/3.42
2ω = 60.86° (wide position), 6.40° (tele position)
CCD pitch: range of 4.2~3.2 μm

| | | | | | | | | |
|---|---|---|---|---|---|---|---|---|
| $r_1$ = | 46.655 | | | | | | | |
| | | $d_1$ = | 1.42 | $n_1$ = | 1.84666 | $v_1$ = | 23.78 | |
| $r_2$ = | 28.687 | | | | | | | |
| | | $d_2$ = | 6.19 | $n_2$ = | 1.48749 | $v_2$ = | 70.23 | |
| $r_3$ = | −966.110 | | | | | | | |
| | | $d_3$ = | 0.10 | | | | | |
| $r_4$ = | 26.324 | | | | | | | |
| | | $d_4$ = | 3.69 | $n_3$ = | 1.69680 | $v_3$ = | 55.53 | |
| $r_5$ = | 84.556 | | | | | | | |
| | | $d_5$ = | $D_1$ (variable) | | | | | |
| $r_6$ = | 72.929 | | | | | | | |
| | | $d_6$ = | 0.95 | $n_4$ = | 1.83400 | $v_4$ = | 37.16 | |
| $r_7$ = | 8.106 | | | | | | | |
| | | $d_7$ = | 4.47 | | | | | |
| $r_8$ = | −46.407 | | | | | | | |
| | | $d_8$ = | 0.85 | $n_5$ = | 1.48749 | $v_5$ = | 70.23 | |
| $r_9$ = | 9.278 | | | | | | | |
| | | $d_9$ = | 3.10 | $n_6$ = | 1.84666 | $v_6$ = | 23.78 | |
| $r_{10}$ = | 24.745 | | | | | | | |
| | | $d_{10}$ = | $D_2$ (variable) | | | | | |
| $r_{11}$ = | stop | | | | | | | |
| | | $d_{11}$ = | $D_3$ (variable) | | | | | |
| $r_{12}$ = | 11.739 (aspherical surface) | | | | | | | |
| | | $d_{12}$ = | 2.00 | $n_7$ = | 1.69350 | $v_7$ = | 53.20 | |
| $r_{13}$ = | −103.859 | | | | | | | |
| | | $d_{13}$ = | 0.10 | | | | | |
| $r_{14}$ = | 6.828 | | | | | | | |
| | | $d_{14}$ = | 3.67 | $n_8$ = | 1.53172 | $v_8$ = | 48.84 | |
| $r_{15}$ = | −360.720 | | | | | | | |
| | | $d_{15}$ = | 0.85 | $n_9$ = | 1.84666 | $v_9$ = | 23.78 | |
| $r_{16}$ = | 5.018 | | | | | | | |
| | | $d_{16}$ = | $D_4$ (variable) | | | | | |
| $r_{17}$ = | 15.189 (aspherical surface) | | | | | | | |
| | | $d_{17}$ = | 2.50 | $n_{10}$ = | 1.69350 | $v_{10}$ = | 53.20 | |
| $r_{18}$ = | −21.080 (aspherical surface) | | | | | | | |
| | | $d_{18}$ = | $D_5$ (variable) | | | | | |
| $r_{19}$ = | ∞ | | | | | | | |
| | | $d_{19}$ = | 3.50 | $n_{11}$ = | 1.51633 | $v_{11}$ = | 64.14 | |
| $r_{20}$ = | ∞ | | | | | | | |
| | | $d_{20}$ = | 1.00 | | | | | |
| $r_{21}$ = | ∞ (image) | | | | | | | | aspherical surface coefficients (12th surface) K = 2.400, $A_4$ = −2.38254 × 10$^{-4}$,
$A_6$ = −1.67265 × 10$^{-6}$, $A_8$ = −1.31762 × 10$^{-7}$
(17th surface) K = 0.000, $A_4$ = −3.90906 × 10$^{-4}$,
$A_6$ = −1.79722 × 10$^{-5}$, $A_8$ = 2.39820 × 10$^{-7}$
(18th surface) K = 8.917, $A_4$ = −2.69983 × 10$^{-4}$,
$A_6$ = −2.00008 × 10$^{-5}$, $A_8$ = 4.52634 × 10$^{-7}$

| | | | |
|---|---|---|---|
| f | 5.891 | 17.246 | 58.882 |
| $D_1$ | 0.80 | 13.32 | 23.40 |
| $D_2$ | 24.42 | 11.82 | 2.20 |
| $D_3$ | 4.66 | 2.02 | 0.80 |
| $D_4$ | 2.80 | 3.43 | 9.01 |
| $D_5$ | 5.50 | 7.59 | 2.96 |

$R_{411}$ = 15.189, $R_{412}$ = −21.08, $f_{41}$ = 13.0993, $f_4$ = 13.09926
$\|(R_{411}/R_{412})|−1\|$ = 0.279459, $|f_4/f_{41}|$ = 0.999997

-continued

Embodiment 3 f = 6.055~16.902~61.215, F/2.80~F/3.26~F/3.70
2ω = 59.40° (wide position), 6.14° (tele position)
CCD pitch: range of 4.2~3.2 μm

| | | | | | | | | |
|---|---|---|---|---|---|---|---|---|
| $r_1$ = | 37.643 | | | | | | | |
| | | $d_1$ = | 1.20 | $n_1$ = | 1.84666 | $v_1$ = | 23.78 | |
| $r_2$ = | 23.940 | | | | | | | |
| | | $d_2$ = | 6.00 | $n_2$ = | 1.60300 | $v_2$ = | 65.44 | |
| $r_3$ = | 119.124 | | | | | | | |
| | | $d_3$ = | 0.10 | | | | | |
| $r_4$ = | 28.996 | | | | | | | |
| | | $d_4$ = | 3.50 | $n_3$ = | 1.72916 | $v_3$ = | 54.68 | |
| $r_5$ = | 79.387 | | | | | | | |
| | | $d_5$ = | $D_1$ (variable) | | | | | |
| $r_6$ = | 35.735 | | | | | | | |
| | | $d_6$ = | 1.20 | $n_4$ = | 1.83481 | $v_4$ = | 42.72 | |
| $r_7$ = | 7.639 | | | | | | | |
| | | $d_7$ = | 5.89 | | | | | |
| $r_8$ = | −22.117 | | | | | | | |
| | | $d_8$ = | 0.90 | $n_5$ = | 1.51633 | $v_5$ = | 64.14 | |
| $r_9$ = | 10.853 | | | | | | | |
| | | $d_9$ = | 3.00 | $n_6$ = | 1.84666 | $v_6$ = | 23.78 | |
| $r_{10}$ = | 37.122 | | | | | | | |
| | | $d_{10}$ = | $D_2$ (variable) | | | | | |
| $r_{11}$ = | stop | | | | | | | |
| | | $d_{11}$ = | $D_3$ (variable) | | | | | |
| $R_{12}$ = | 12.107 (aspherical surface) | | | | | | | |
| | | $d_{12}$ = | 2.50 | $n_7$ = | 1.56384 | $v_7$ = | 60.67 | |
| $r_{13}$ = | −21.714 | | | | | | | |
| | | $d_{13}$ = | 0.10 | | | | | |
| $r_{14}$ = | 6.922 | | | | | | | |
| | | $d_{14}$ = | 2.09 | $n_8$ = | 1.53996 | $v_8$ = | 59.46 | |
| $r_{15}$ = | 10.137 | | | | | | | |
| | | $d_{15}$ = | 0.80 | $n_9$ = | 1.84666 | $v_9$ = | 23.78 | |
| $r_{16}$ = | 5.676 | | | | | | | |
| | | $d_{16}$ = | $D_4$ (variable) | | | | | |
| $r_{17}$ = | −12.534 | | | | | | | |
| | | $d_{17}$ = | 0.80 | $n_{10}$ = | 1.84666 | $v_{10}$ = | 23.78 | |
| $r_{18}$ = | 35.083 | | | | | | | |
| | | $d_{18}$ = | 2.50 | $n_{11}$ = | 1.62588 | $v_{11}$ = | 35.70 | |
| $r_{19}$ = | −22.535 | | | | | | | |
| | | $d_{19}$ = | 0.10 | | | | | |
| $r_{20}$ = | 12.691 | | | | | | | |
| | | $d_{20}$ = | 2.50 | $n_{12}$ = | 1.58913 | $v_{12}$ = | 61.25 | |
| $r_{21}$ = | −21.557 (aspherical surface) | | | | | | | |
| | | $d_{21}$ = | $D_5$ (variable) | | | | | |
| $r_{22}$ = | ∞ | | | | | | | |
| | | $d_{22}$ = | 3.50 | $n_{13}$ = | 1.51633 | $v_{13}$ = | 64.14 | |
| $r_{23}$ = | ∞ | | | | | | | |
| | | $d_{23}$ = | 1.00 | | | | | |
| $r_{14}$ = | ∞ (image) | | | | | | | | aspherical surface coefficients (12th surface) K = 1.372, $A_4$ = −2.17210 × 10$^{-4}$,
$A_6$ = −2.25003 × 10$^{-6}$
(21st surface) K = −0.548, $A_4$ = 1.51758 × 10$^{-4}$,
$A_6$ = 3.49481 × 10$^{-6}$, $A_8$ = −1.91684 × 10$^{-7}$

| | | | |
|---|---|---|---|
| f | 6.055 | 16.902 | 61.215 |
| $D_1$ | 0.62 | 12.77 | 23.21 |
| $D_2$ | 24.72 | 12.10 | 2.29 |
| $D_3$ | 3.44 | 0.99 | 0.94 |
| $D_4$ | 4.36 | 4.55 | 9.57 |
| $D_5$ | 5.57 | 8.39 | 2.77 |

$R_{411}$ = −12.534, $R_{412}$ = 35.083, $f_{41}$ = −10.8236, $f_{42}$ = 22.2958
$f_{43}$ = 13.9368, $f_4$ = 23.88937,
$\|(R_{411}/R_{412})|−1\|$ = 0.64273, $|f_4/f_{41}|$ = 2.207156,
$|f_4/f_{42}|$ = 1.071474, $|f_4/f_{43}|$ = 1.714122

-continued

Embodiment 4 f = 5.877~15.917~61.008, F/2.80~F/3.11~F/3.92
2ω = 60.6° (wide position), 6.14° (tele position)
CCD pitch: range of 4.2~3.2 μm

| | | | | | | | |
|---|---|---|---|---|---|---|---|
| $r_1$ = | 53.604 | | | | | | |
| | | $d_1$ = | 1.42 | $n_1$ = | 1.84666 | $v_1$ = | 23.78 |
| $r_2$ = | 27.497 | | | | | | |
| | | $d_2$ = | 5.47 | $n_2$ = | 1.65160 | $v_2$ = | 58.55 |
| $r_3$ = | 554.374 | | | | | | |
| | | $d_3$ = | 0.09 | | | | |
| $r_4$ = | 25.359 | | | | | | |
| | | $d_4$ = | 3.19 | $n_3$ = | 1.72916 | $v_3$ = | 54.68 |
| $r_5$ = | 67.717 | | | | | | |
| | | $d_5$ = | $D_1$ (variable) | | | | |
| $r_6$ = | 38.745 | | | | | | |
| | | $d_6$ = | 0.95 | $n_4$ = | 1.81600 | $v_4$ = | 46.62 |
| $r_7$ = | 7.357 | | | | | | |
| | | $d_7$ = | 5.51 | | | | |
| $r_8$ = | −26.317 | | | | | | |
| | | $d_8$ = | 0.73 | $n_5$ = | 1.51742 | $v_5$ = | 52.43 |
| $r_9$ = | 9.260 | | | | | | |
| | | $d_9$ = | 2.74 | $n_6$ = | 1.84666 | $v_6$ = | 23.78 |
| $r_{10}$ = | 35.535 | | | | | | |
| | | $d_{10}$ = | $D_2$ (variable) | | | | |
| $r_{11}$ = | stop | | | | | | |
| | | $d_{11}$ = | $D_3$ (variable) | | | | |
| $r_{12}$ = | 9.386 (aspherical surface) | | | | | | |
| | | $d_{12}$ = | 3.37 | $n_7$ = | 1.69350 | $v_7$ = | 53.20 |
| $r_{13}$ = | 42.113 | | | | | | |
| | | $d_{13}$ = | 0.10 | | | | |
| $r_{14}$ = | 12.263 | | | | | | |
| | | $d_{14}$ = | 1.80 | $n_8$ = | 1.72342 | $v_8$ = | 37.95 |
| $r_{15}$ = | 353.462 | | | | | | |
| | | $d_{15}$ = | 0.77 | $n_9$ = | 1.84666 | $v_9$ = | 23.78 |
| $r_{16}$ = | 6.300 | | | | | | |
| | | $d_{16}$ = | $D_4$ (variable) | | | | |
| $R_{17}$ = | −10.184 | | | | | | |
| | | $d_{17}$ = | 0.90 | $n_{10}$ = | 1.80518 | $v_{10}$ = | 25.42 |
| $r_{18}$ = | −13.515 | | | | | | |
| | | $d_{18}$ = | 0.10 | | | | |
| $r_{19}$ = | 13.351 (aspherical surface) | | | | | | |
| | | $d_{19}$ = | 2.63 | $n_{11}$ = | 1.58913 | $v_{11}$ = | 61.25 |
| $r_{20}$ = | −18.066 | | | | | | |
| | | $d_{20}$ = | $D_5$ (variable) | | | | |
| $r_{21}$ = | ∞ | | | | | | |
| | | $d_{21}$ = | 3.50 | $n_{12}$ = | 1.51633 | $v_{12}$ = | 64.14 |
| $r_{22}$ = | ∞ | | | | | | |
| | | $d_{22}$ = | 1.00 | | | | |
| $r_{23}$ = | ∞ (image) | | | | | | | aspherical surface coefficients (12th surface) K = 0.358, $A_4$ = −2.11486 × 10$^{-4}$, $A_6$ = −1.78509 × 10$^{-6}$, $A_8$ = −1.45368 × 10$^{-8}$
(19th surface) K = −0.651, $A_4$ = −6.76701 × 10$^{-3}$

| f | 5.877 | 15.917 | 61.008 |
|---|---|---|---|
| $D_1$ | 0.60 | 11.88 | 21.67 |
| $D_2$ | 22.66 | 10.06 | 2.09 |
| $D_3$ | 4.81 | 2.87 | 0.69 |
| $D_4$ | 3.89 | 4.56 | 12.26 |
| $D_5$ | 6.17 | 7.94 | 1.77 |

$R_{411}$ = −10.184, $R_{412}$ = −13.515, $f_{41}$ = −58.3355, $f_{42}$ = 13.4494
$f_4$ = 16.34129, $||(R_{411}/R_{412})|-1|$ = 0.246467
$|f_4/f_{41}|$ = 0.280126, $|f_4/f_{42}|$ = 1.21502

Embodiment 5 f = 5.946~17.926~57.820, F/3.02~F/3.01~F/2.98
2ω = 61.86° (wide position), 6.60° (tele position)
CCD pitch: range of 4.2~3.2 μm

| | | | | | | | |
|---|---|---|---|---|---|---|---|
| $r_1$ = | 53.691 | | | | | | |
| | | $d_1$ = | 1.09 | $n_1$ = | 1.84666 | $v_1$ = | 23.78 |
| $r_2$ = | 29.532 | | | | | | |
| | | $d_2$ = | 9.27 | $n_2$ = | 1.69680 | $v_2$ = | 55.53 |
| $r_3$ = | 279.317 | | | | | | |
| | | $d_3$ = | 0.10 | | | | |
| $r_4$ = | 30.637 | | | | | | |
| | | $d_4$ = | 5.62 | $n_3$ = | 1.72916 | $v_3$ = | 54.68 |
| $r_5$ = | 75.171 | | | | | | |
| | | $d_5$ = | $D_1$ (variable) | | | | |
| $r_6$ = | 21.286 | | | | | | |
| | | $d_6$ = | 1.02 | $n_4$ = | 1.80610 | $v_4$ = | 40.92 |
| $r_7$ = | 8.351 | | | | | | |
| | | $d_7$ = | 6.00 | | | | |
| $r_8$ = | −12.326 | | | | | | |
| | | $d_8$ = | 1.06 | $n_5$ = | 1.64000 | $v_5$ = | 60.07 |
| $r_9$ = | 10.569 | | | | | | |
| | | $d_9$ = | 2.67 | $n_6$ = | 1.84666 | $v_6$ = | 23.78 |
| $r_{10}$ = | 45.176 | | | | | | |
| | | $d_{10}$ = | $D_2$ (variable) | | | | |
| $r_{11}$ = | stop | | | | | | |
| | | $d_{11}$ = | 0.87 | | | | |
| $r_{12}$ = | 9.530 (aspherical surface) | | | | | | |
| | | $d_{12}$ = | 1.97 | $n_7$ = | 1.58913 | $v_7$ = | 61.25 |
| $r_{13}$ = | −83.491 | | | | | | |
| | | $d_{13}$ = | 1.36 | | | | |
| $r_{14}$ = | 6.084 | | | | | | |
| | | $d_{14}$ = | 1.55 | $n_8$ = | 1.65160 | $v_8$ = | 58.55 |
| $r_{15}$ = | 9.111 | | | | | | |
| | | $d_{15}$ = | 1.04 | $n_9$ = | 1.84666 | $v_9$ = | 23.78 |
| $r_{16}$ = | 4.439 | | | | | | |
| | | $d_{16}$ = | $D_3$ (variable) | | | | |
| $r_{17}$ = | −21.013 | | | | | | |
| | | $d_{17}$ = | 0.96 | $n_{10}$ = | 1.80518 | $v_{10}$ = | 25.42 |
| $r_{18}$ = | −208.853 | | | | | | |
| | | $d_{18}$ = | 0.10 | | | | |
| $r_{19}$ = | 8.721 (aspherical surface) | | | | | | |
| | | $d_{19}$ = | 2.79 | $n_{11}$ = | 1.58913 | $v_{11}$ = | 61.25 |
| $r_{20}$ = | −15.816 | | | | | | |
| | | $d_{20}$ = | $D_4$ (variable) | | | | |
| $r_{21}$ = | ∞ | | | | | | |
| | | $d_{21}$ = | 0.80 | $n_{12}$ = | 1.51633 | $v_{12}$ = | 64.14 |
| $r_{22}$ = | ∞ | | | | | | |
| | | $d_{22}$ = | 1.49 | $n_{13}$ = | 1.54771 | $v_{13}$ = | 62.84 |
| $r_{23}$ = | ∞ | | | | | | |
| | | $d_{23}$ = | 0.80 | | | | |
| $r_{24}$ = | ∞ | | | | | | |
| | | $d_{24}$ = | 0.75 | $n_{14}$ = | 1.51633 | $v_{14}$ = | 64.14 |
| $r_{25}$ = | ∞ | | | | | | |
| | | $d_{25}$ = | 1.20 | | | | |
| $r_{26}$ = | ∞ (image) | | | | | | | aspherical surface coefficients (12th surface) K = 2.004, $A_4$ = −4.14579 × 10$^{-4}$, $A_6$ = −6.98863 × 10$^{-6}$, $A_8$ = −2.40722 × 10$^{-7}$
(19th surface) K = 0.489, $A_4$ = −4.55746 × 10$^{-4}$

| f | 5.946 | 17.926 | 57.820 |
|---|---|---|---|
| $D_1$ | 0.05 | 13.80 | 22.76 |
| $D_2$ | 23.70 | 9.94 | 1.00 |
| $D_3$ | 6.28 | 3.16 | 5.55 |
| $D_4$ | 3.41 | 6.55 | 4.13 |

$R_{411}$ = −21.013, $R_{412}$ = −208.853, $f_{41}$ = −29.0824, $f_{42}$ = 9.9625
$f_4$ = 14.15723, $||(R_{411}/R_{412})|-1|$ = 0.899389
$|f_4/f_{41}|$ = 0.486797, $|f_4/f_{42}|$ = 1.421052

-continued

Embodiment 6 f = 5.931~17.234~60.987, F/2.80~F/3.18~F/3.84
2ω = 60.40° (wide position), 6.08° (tele position)
CCD pitch: range of 4.2~3.2 μm

| | | | | | | | |
|---|---|---|---|---|---|---|---|
| $r_1$ = | 44.766 | | | | | | |
| | | $d_1$ = | 1.15 | $n_1$ = | 1.84666 | $\nu_1$ = | 23.78 |
| $r_2$ = | 24.377 | | | | | | |
| | | $d_2$ = | 5.76 | $n_2$ = | 1.69680 | $\nu_2$ = | 55.53 |
| $r_3$ = | 140.541 | | | | | | |
| | | $d_3$ = | 0.10 | | | | |
| $r_4$ = | 28.504 | | | | | | |
| | | $d_4$ = | 3.36 | $n_3$ = | 1.74100 | $\nu_3$ = | 52.64 |
| $r_5$ = | 81.346 | | | | | | |
| | | $d_5$ = | $D_1$ (variable) | | | | |
| $r_6$ = | 54.614 | | | | | | |
| | | $d_6$ = | 1.15 | $n_4$ = | 1.81600 | $\nu_4$ = | 46.62 |
| $r_7$ = | 8.270 | | | | | | |
| | | $d_7$ = | 4.64 | | | | |
| $r_8$ = | −35.870 | | | | | | |
| | | $d_8$ = | 0.77 | $n_5$ = | 1.72000 | $\nu_5$ = | 46.04 |
| $r_9$ = | 10.497 | | | | | | |
| | | $d_9$ = | 2.88 | $n_6$ = | 1.84666 | $\nu_6$ = | 23.78 |
| $r_{10}$ = | 117.037 | | | | | | |
| | | $d_{10}$ = | $D_2$ (variable) | | | | |
| $r_{11}$ = | stop | | | | | | |
| | | $d_{11}$ = | $D_3$ (variable) | | | | |
| $R_{12}$ = | 12.956 (aspherical surface) | | | | | | |
| | | $d_{12}$ = | 1.73 | $n_7$ = | 1.69350 | $\nu_7$ = | 53.20 |
| $r_{13}$ = | 1112.783 (aspherical surface) | | | | | | |
| | | $d_{13}$ = | 0.10 | | | | |
| $r_{14}$ = | 8.935 | | | | | | |
| | | $d_{14}$ = | 1.71 | $n_8$ = | 1.81600 | $\nu_8$ = | 46.62 |
| $r_{15}$ = | 19.928 | | | | | | |
| | | $d_{15}$ = | 0.77 | $n_9$ = | 1.84666 | $\nu_9$ = | 23.78 |
| $r_{16}$ = | 7.568 | | | | | | |
| | | $d_{16}$ = | $D_4$ (variable) | | | | |
| $r_{17}$ = | −16.047 | | | | | | |
| | | $d_{17}$ = | 0.84 | $n_{10}$ = | 1.80518 | $\nu_{10}$ = | 25.42 |
| $r_{18}$ = | 291.528 | | | | | | |
| | | $d_{18}$ = | 0.10 | | | | |
| $r_{19}$ = | 14.993 (aspherical surface) | | | | | | |
| | | $d_{19}$ = | 2.49 | $n_{11}$ = | 1.69350 | $\nu_{11}$ = | 53.20 |
| $r_{20}$ = | −14.169 (aspherical surface) | | | | | | |
| | | $d_{20}$ = | $D_5$ (variable) | | | | |
| $r_{21}$ = | ∞ | | | | | | |
| | | $d_{21}$ = | 3.50 | $n_{12}$ = | 1.51633 | $\nu_{12}$ = | 64.14 |
| $r_{22}$ = | ∞ | | | | | | |
| | | $d_{22}$ = | 1.00 | | | | |
| $r_{23}$ = | ∞ (image) | | | | | | | aspherical surface coefficients (12th surface) K = 0.272, $A_4$ = 1.64696 × 10$^{-4}$, $A_6$ = 5.95729 × 10$^{-6}$
(13th surface) K = 4.704, $A_4$ = 2.52026 × 10$^{-4}$, $A_6$ = 5.36009 × 10$^{-6}$, $A_8$ = 7.74646 × 10$^{-8}$
(19th surface) K = −0.077, $A_4$ = −1.84173 × 10$^{-4}$, $A_6$ = −2.87066 × 10$^{-6}$, $A_8$ = −1.53198 × 10$^{-7}$
(20th surface) K = 2.056, $A_4$ = 2.04380 × 10$^{-4}$, $A_6$ = 9.66480 × 10$^{-8}$, $A_8$ = −2.09575 × 10$^{-7}$ -continued

| | | | |
|---|---|---|---|
| f | 5.931 | 17.234 | 60.987 |
| $D_1$ | 0.96 | 12.95 | 22.13 |
| $D_2$ | 23.14 | 10.29 | 2.16 |
| $D_3$ | 5.11 | 3.09 | 0.85 |
| $D_4$ | 3.71 | 4.52 | 12.67 |
| $D_5$ | 7.72 | 9.58 | 3.07 |

$R_{411}$ = −16.047, $R_{412}$ = 291.528, $f_{41}$ = −18.8672, $f_{42}$ = 10.8859
$f_4$ = 22.07126, $| (R_{411}/R_{412}) -1 |$ = 0.944956
$| f_4/f_{41} |$ = 1.169822, $| f_4/f_{42} |$ = 2.027509

Embodiment 7 f = 5.906~16.803~60.140, F/2.80~F/3.26~F/4.30
2ω = 60.60° (wide position), 6.22° (tele position)
CCD pitch: range of 4.2~3.2 μm

| | | | | | | | |
|---|---|---|---|---|---|---|---|
| $r_1$ = | 44.689 | | | | | | |
| | | $d_1$ = | 1.42 | $n_1$ = | 1.84666 | $\nu_1$ = | 23.78 |
| $r_2$ = | 25.256 | | | | | | |
| | | $d_2$ = | 5.47 | $n_2$ = | 1.65160 | $\nu_2$ = | 58.55 |
| $r_3$ = | 249.304 | | | | | | |
| | | $d_3$ = | 0.09 | | | | |
| $r_4$ = | 29.230 | | | | | | |
| | | $d_4$ = | 3.19 | $n_3$ = | 1.69680 | $\nu_3$ = | 55.53 |
| $r_5$ = | 91.595 | | | | | | |
| | | $d_5$ = | $D_1$ (variable) | | | | |
| $r_6$ = | 51.908 | | | | | | |
| | | $d_6$ = | 0.95 | $n_4$ = | 1.81600 | $\nu_4$ = | 46.62 |
| $r_7$ = | 7.663 | | | | | | |
| | | $d_7$ = | 5.02 | | | | |
| $r_8$ = | −23.041 | | | | | | |
| | | $d_8$ = | 0.73 | $n_5$ = | 1.51742 | $\nu_5$ = | 52.43 |
| $r_9$ = | 10.929 | | | | | | |
| | | $d_9$ = | 2.74 | $n_6$ = | 1.84666 | $\nu_6$ = | 23.78 |
| $r_{10}$ = | 53.992 | | | | | | |
| | | $d_{10}$ = | $D_2$ (variable) | | | | |
| $r_{11}$ = | stop | | | | | | |
| | | $d_{11}$ = | $D_3$ (variable) | | | | |
| $r_{12}$ = | 8.014 (aspherical surface) | | | | | | |
| | | $d_{12}$ = | 3.17 | $n_7$ = | 1.69350 | $\nu_7$ = | 53.20 |
| $r_{13}$ = | −23.300 (aspherical surface) | | | | | | |
| | | $d_{13}$ = | 0.10 | | | | |
| $r_{14}$ = | 16.827 | | | | | | |
| | | $d_{14}$ = | 0.77 | $n_8$ = | 1.84666 | $\nu_8$ = | 23.78 |
| $r_{15}$ = | 6.933 | | | | | | |
| | | $d_{15}$ = | $D_4$ (variable) | | | | |
| $r_{16}$ = | −7.127 | | | | | | |
| | | $d_{16}$ = | 0.90 | $n_9$ = | 1.80518 | $\nu_9$ = | 25.42 |
| $r_{17}$ = | −14.050 | | | | | | |
| | | $d_{17}$ = | 0.10 | | | | |
| $r_{18}$ = | 30.417 (aspherical surface) | | | | | | |
| | | $d_{18}$ = | 2.76 | $n_{10}$ = | 1.69350 | $\nu_{10}$ = | 53.20 |
| $r_{19}$ = | −10.866 (aspherical surface) | | | | | | |
| | | $d_{19}$ = | $D_5$ (variable) | | | | |
| $r_{20}$ = | ∞ | | | | | | |
| | | $d_{20}$ = | 3.50 | $n_{11}$ = | 1.51633 | $\nu_{11}$ = | 64.14 |
| $r_{21}$ = | ∞ | | | | | | |
| | | $d_{21}$ = | 1.00 | | | | |
| $r_{22}$ = | ∞ (image) | | | | | | |

-continued aspherical surface coefficients

| | |
|---|---|
| (12th surface) | $K = 0.454, A_4 = -3.06324 \times 10^{-4},$<br>$A_6 = -2.61787 \times 10^{-6}, A_8 = -1.65182 \times 10^{-7}$ |
| (13th surface) | $K = 18.609, A_4 = 3.84567 \times 10^{-4},$<br>$A_6 = -2.87601 \times 10^{-8}, A_8 = 1.93141 \times 10^{-7}$ |
| (18th surface) | $K = 1.557, A_4 = 1.01895 \times 10^{-4}$ |
| (19th surface) | $K = 1.097, A_4 = 3.00733 \times 10^{-4},$<br>$A_6 = 7.17409 \times 10^{-6}, A_8 = -1.31885 \times 10^{-7}$ |
| f | 5.906　　　16.803　　　60.140 |
| $D_1$ | 0.90　　　12.88　　　21.71 |
| $D_2$ | 23.06　　　11.04　　　2.30 |
| $D_3$ | 5.47　　　2.54　　　0.68 |
| $D_4$ | 4.46　　　5.82　　　14.69 |
| $D_5$ | 7.83　　　9.40　　　2.41 |
| $R_{411} = -7.127, R_{412} = -14.05, f_{41} = -19.0678, f_{42} = 11.8687$ | |
| $f_4 = 23.55973, \| (R_{411}/R_{412}) \| -1 \| = 0.49274$ | |
| $\| f_4/f_{41} \| = 1.235577, \| f_4/f_{42} \| = 1.98503$ | |

Embodiment 8

$f = 5.920 \sim 17.176 \sim 58.019, F/2.82 \sim F/3.43 \sim F/3.54$
$2\omega = 60.5°$ (wide position), $6.5°$ (tele position)
CCD pitch: range of ?? μm

| | | | | | | | |
|---|---|---|---|---|---|---|---|
| $r_1 =$ | 51.231 | | | | | | |
| | | $d_1 =$ | 1.80 | $n_1 =$ | 1.84666 | $v_1 =$ | 23.78 |
| $r_2 =$ | 28.759 | | | | | | |
| | | $d_2 =$ | 6.70 | $n_2 =$ | 1.49700 | $v_2 =$ | 81.54 |
| $r_3 =$ | −360.750 | | | | | | |
| | | $d_3 =$ | 0.10 | | | | |
| $r_4 =$ | 25.924 | | | | | | |
| | | $d_4 =$ | 4.10 | $n_3 =$ | 1.72000 | $v_3 =$ | 46.02 |
| $r_5 =$ | 90.885 | | | | | | |
| | | $d_5 =$ | $D_1$ (variable) | | | | |
| $r_6 =$ | 97.158 | | | | | | |
| | | $d_6 =$ | 1.10 | $n_4 =$ | 1.83400 | $v_4 =$ | 37.16 |
| $r_7 =$ | 8.088 | | | | | | |
| | | $d_7 =$ | 4.30 | | | | |
| $r_8 =$ | −29.790 | | | | | | |
| | | $d_8 =$ | 0.85 | $n_5 =$ | 1.51823 | $v_5 =$ | 58.90 |
| $r_9 =$ | 9.679 | | | | | | |
| | | $d_9 =$ | 3.20 | $n_6 =$ | 1.84666 | $v_6 =$ | 23.78 |
| $r_{10} =$ | 35.803 | | | | | | |
| | | $d_{10} =$ | $D_2$ (variable) | | | | |
| $r_{11} =$ | stop | | | | | | |
| | | $d_{11} =$ | $D_3$ (variable) | | | | |
| $r_{12} =$ | 13.254 (aspherical surface) | | | | | | |
| | | $d_{12} =$ | 2.00 | $n_7 =$ | 1.80610 | $v_7 =$ | 40.92 |
| $r_{13} =$ | −671.816 | | | | | | |
| | | $d_{13} =$ | 1.00 | | | | |
| $r_{14} =$ | 5.407 | | | | | | |
| | | $d_{14} =$ | 2.40 | $n_8 =$ | 1.51633 | $v_8 =$ | 64.14 |
| $r_{15} =$ | 42.766 | | | | | | |
| | | $d_{15} =$ | 0.80 | $n_9 =$ | 1.80518 | $v_9 =$ | 25.42 |
| $r_{16} =$ | 4.504 | | | | | | |
| | | $d_{16} =$ | $D_4$ (variable) | | | | |
| $r_{17} =$ | 10.559 (aspherical surface) | | | | | | |
| | | $d_{17} =$ | 2.70 | $n_{10} =$ | 1.58913 | $v_{10} =$ | 61.28 |
| $r_{18} =$ | −35.937 (aspherical surface) | | | | | | |
| | | $d_{18} =$ | $D_5$ (variable) | | | | |
| $r_{19} =$ | ∞ | | | | | | |
| | | $d_{19} =$ | 3.03 | $n_{11} =$ | 1.51633 | $v_{11} =$ | 64.14 |
| $r_{20} =$ | ∞ | | | | | | |
| | | $d_{20} =$ | 2.00 | | | | |
| $r_{21} =$ | ∞ (image) | | | | | | |

-continued aspherical surface coefficients

| | |
|---|---|
| (12th surface) | $K = -1.594, A_4 = 4.77645 \times 10^{-5},$<br>$A_6 = 1.03633 \times 10^{-6}, A_8 = -4.33729 \times 10^{-8}$ |
| (17th surface) | $K = 0.000, A_4 = -1.85332 \times 10^{-4},$<br>$A_6 = 1.68690 \times 10^{-6}$ |
| (18th surface) | $K = 43.051, A_4 = -2.58445 \times 10^{-5}$<br>$A_6 = 1.24478 \times 10^{-5}, A_8 = 1.79724 \times 10^{-7}$ |
| f | 5.921　　　17.176　　　58.019 |
| $D_1$ | 0.87　　　12.13　　　21.81 |
| $D_2$ | 23.14　　　11.89　　　2.21 |
| $D_3$ | 5.03　　　1.09　　　0.75 |
| $D_4$ | 3.50　　　5.15　　　10.31 |
| $D_5$ | 4.95　　　7.23　　　2.42 |
| $R_{411} = 10.659, R_{412} = -35.937, f_{41} = -14.2603, f_4 = 14.2603$ | |
| $\| (R_{411}/R_{412}) \| -1 \| = 0.703398, \| f_4/f_{41} \| = 1.0000$ | | wherein reference symbols $r_1, r_2, \ldots$ represent radii of curvature on surfaces of respective lens elements, reference symbols $d_1, d_2, \ldots$ designate thicknesses of the respective lens elements and airspaces reserved therebetween, reference symbols $n_1, n_2, \ldots$ denote refractive indices of the respective lens elements, and reference symbols $v_1, v_2, \ldots$ represent Abbe's numbers of the respective lens elements. In addition, lengths such as $r_1, r_2, \ldots$ and $d_1, d_2$ are specified in a unit of millimeter in the numerical data.

The first embodiment has a composition shown in FIG. 1, comprises a first lens unit G1 having positive refractive power, a second lens unit G2 having negative refractive power, a third lens unit G3 having positive refractive power and a fourth lens unit G4 having positive refractive power, and changes a magnification from a wide position to a tele position by moving the second, third and fourth lens units respectively along an optical axis while keeping the first lens unit G1 stationary.

Furthermore, the first lens unit G1 comprises a cemented lens component consisting of a negative lens element and a positive lens element, and a positive lens component, the second lens unit G2 comprises a negative lens component, and a cemented lens component consisting of a negative lens element and a positive lens element, the third lens unit G3 comprises a positive lens component, and a cemented lens component consisting of a positive lens element and a negative lens element, and the fourth lens unit G4 comprises a negative lens component and a positive lens component. That is, a rear subunit of the third lens unit consists of a meniscus cemented lens component and a front subunit of the fourth lens unit consists of a single negative meniscus lens element.

In the first embodiment, radii of curvature $R_{3r1}, R_{3r2}, R_{3r2}$ and $R_{3r4}$ of the third lens unit are $r_{16}, r_{14}, r_{12}$ and $r_{12}$ respectively. In the numerical data, and radii of curvature $R_{4f1}, R_{4f2}, R_{4f3}$ and $R_{4f4}$ of the fourth lens unit are $r_{17}, r_{15}, r_{19}$ and $r_{20}$ respectively. Furthermore, $R_{411} = R_{4f1} = r_{17}$ and $R_{412} = R_{4f2} = r_{18}$. The first embodiment satisfies the condition (1) as shown in the numerical data.

Furthermore, both focal lengths $f_{41}$ and $f_{42}$ of the negative lens component and the positive lens component of the fourth lens unit G4 are as shown in the numerical data and satisfy the condition (2).

In the optical system according to the first embodiment, $r_{12}$ and $r_{19}$ are aspherical surfaces.

In FIG. 1, a reference symbol S represents a stop, and a reference symbol F designates filters such as an infrared cut filter, an optical low pass filter and the like.

Figure 2:
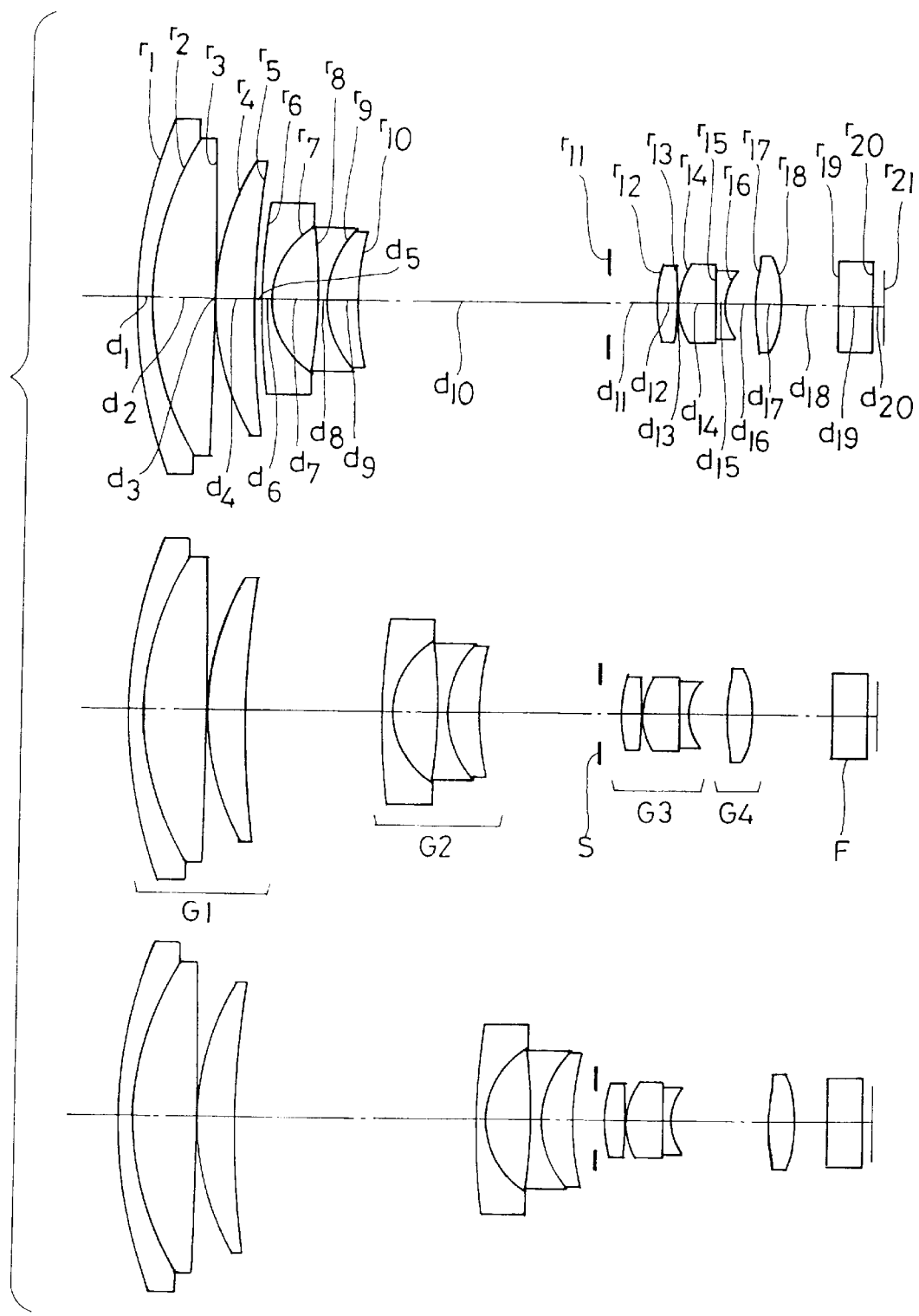
FIG. 2 is a sectional view showing a composition of a second embodiment of the present invention.

The second embodiment comprises a first lens unit G1 having positive refractive power, a second lens unit G2 having negative refractive power, a third lens unit G3 having positive refractive power and a fourth lens unit G4 having positive refractive power as shown in FIG. 2, and changes a magnification from a wide position to a tele position by moving the second lens unit G2, the third lens unit G3 and the fourth lens unit G4 along an optical axis while keeping the first lens unit G1 stationary.

The first lens unit G1, the second lens unit G2 and the third lens unit G3 of the optical system according to the second embodiment have compositions which are similar to those of the first through third lens units of the first embodiment, whereas the fourth lens unit G4 of the second embodiment consists of a positive lens component having two aspherical surfaces and is different from the fourth lens unit of the first embodiment. That is, the optical system according to the second embodiment has the fourth composition.

In the second embodiment $R_{411}=r_{17}$, $R_{412}=r_{18}$, and the single lens element of the fourth lens unit has a focal length $f_{41}$ ($f_{4s}$), and satisfies the conditions (1) and (2).

Furthermore, $r_{12}$, $r_{17}$ and $r_{18}$ are aspherical surfaces. Out of these aspherical surfaces, $r_{17}$ and $r_{18}$ are surfaces of the fourth lens unit G4, and the fourth lens unit G4 is composed of a lens component using an aspherical lens component which has aspherical surfaces on both sides as described above.

In FIG. 2, a reference symbol S represents a stop, and a reference symbol F designates filters such as an infrared cut filter, an optical low pass filter and the like.

Figure 3:
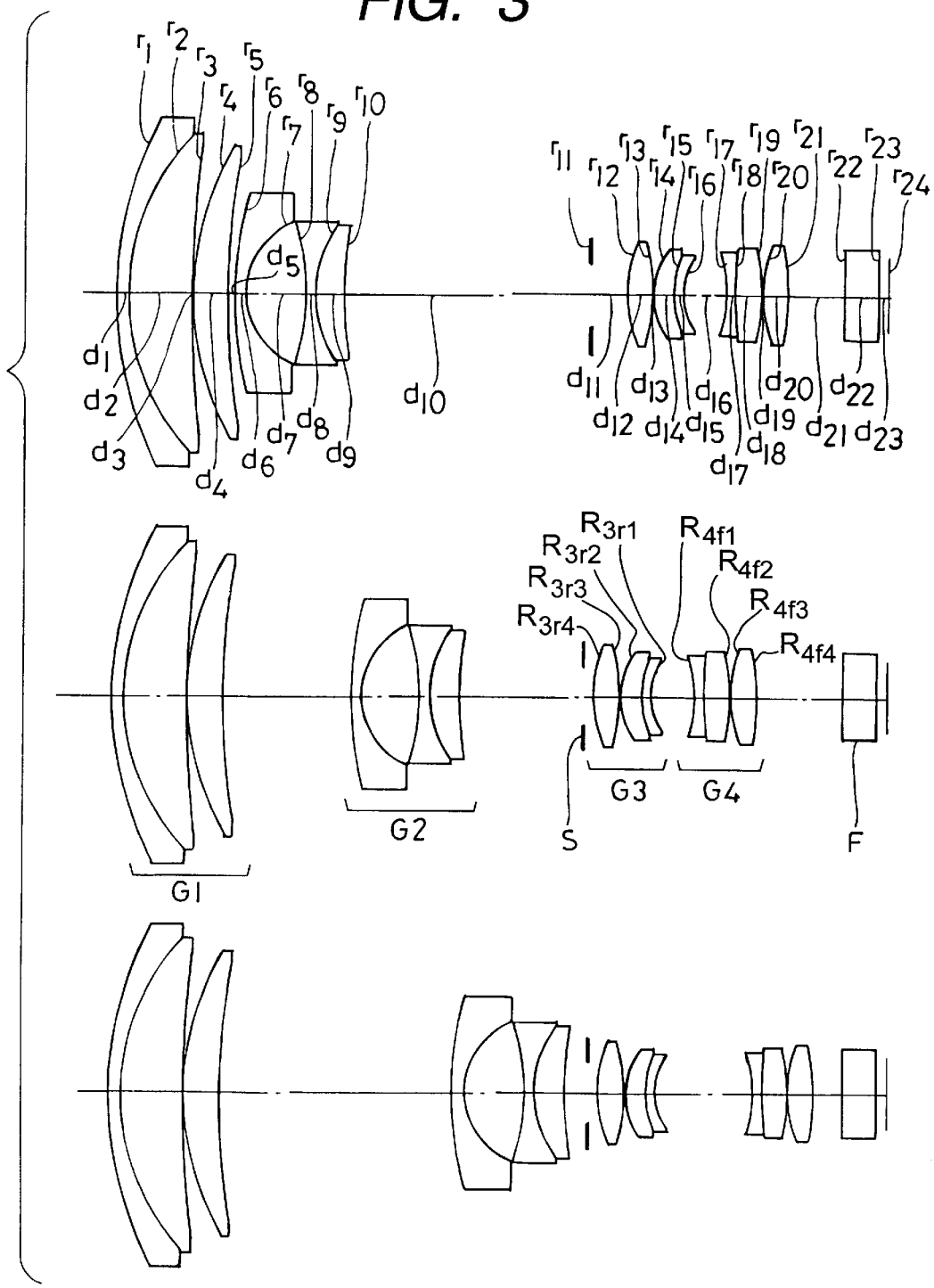
FIG. 3 is a sectional view showing a composition of a third embodiment of the present invention.

The third embodiment comprises a first lens unit G1 having positive refractive power, a second lens unit G2 having negative refractive power, a third lens unit G3 having positive refractive power and a fourth lens unit G4 having positive refractive power as shown in FIG. 3.

The first lens unit G1, the second lens unit G2 and the third lens unit G3 of the third embodiment have compositions similar to those of the first through third lens units of the first embodiment, whereas front subunit of the fourth lens unit G4 of the third embodiment which consists of a cemented lens component consisting of a negative lens element and a positive lens element, and a single biconvex lens element is different from front subunit or the fourth lens unit of the first embodiment. That is, both the rear subunit of the third lens unit and the front subunit of the fourth lens unit are meniscus cemented lens components.

In the third embodiment, it is preferable for correction of aberrations to compose the fourth lens unit of four lens elements: a cemented lens component consisting of a negative lens element and a positive lens element, and two lens elements.

In the third embodiment, $R_{3r1}$, $R_{3r2}$, $R_{3r3}$ and $R_{3r4}$ of the third lens unit G3 are $r_{16}$, $r_{14}$, $r_{13}$ and $r_{12}$ respectively, and $R_{4f1}$, $R_{4f2}$, $R_{4f3}$ and $R_{4f4}$ of the fourth lens unit G4 are $r_{17}$, $r_{19}$, $r_{20}$ and $r_{21}$ respectively. Furthermore, $R_{411}=R_{4f1}$ and $R_{412}=r_{18}$. Accordingly, $R_{411}=r_{17}$ and $r_{412}=r_{10}$, thereby satisfying the condition (1).

Furthermore, the fourth lens unit G4 of the third embodiment consists of a cemented lens component consisting of an object side negative lens element and an image side positive lens element, and a positive lens component, and focal lengths $f_{41}$, $f_{42}$ and $f_{43}$ ($f_s$) of these lens elements have values which are listed in the numerical data and satisfy the condition (2).

In the third embodiment, surfaces $r_{12}$ and $r_{21}$ are aspherical surfaces.

In FIG. 3, a reference symbol S represents a stop, and a reference symbol F designates filters such as an infrared cut filter, an optical low pass filter and the like.

Figure 4:
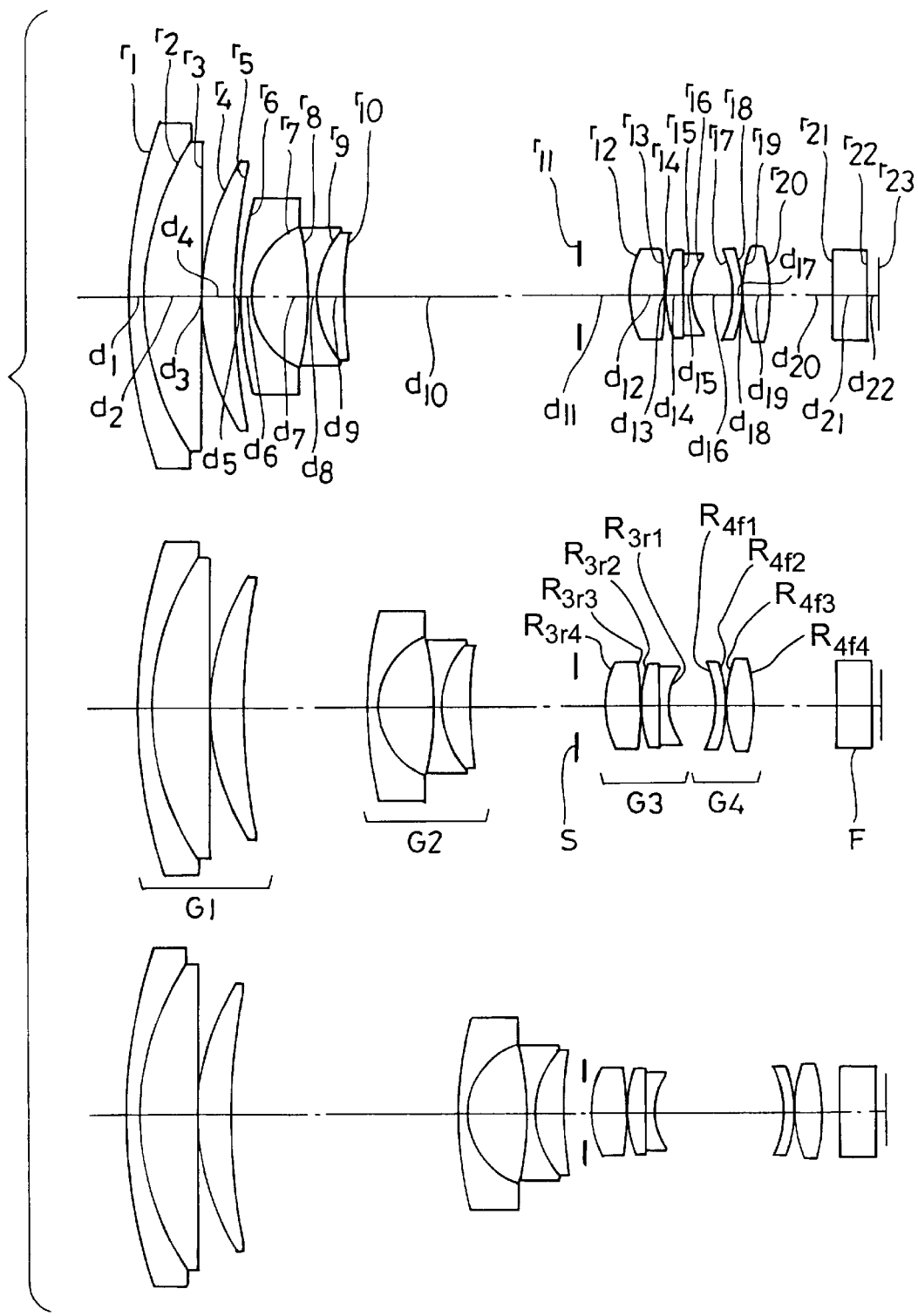
FIG. 4 is a sectional view showing a composition of a fourth embodiment of the present invention.

The fourth embodiment has a composition shown in FIG. 4, and comprises a first lens unit G1 having positive refractive power, a second lens unit G2 having negative refractive power, a third lens unit G3 having positive refractive power and a fourth lens unit G4 having positive refractive power.

The first lens unit G1, the second lens unit G2, the third lens unit G3 and the fourth lens unit G4 of the fourth embodiment have compositions which are similar to those of the first, second, third and fourth lens units of the first embodiment.

In the fourth embodiment, radii of curvature $R_{3r1}$, $R_{3r2}$, $R_{3r3}$ and $R_{3r4}$ of the third lens unit G3 are $r_{16}$, $r_{14}$, $r_{13}$ and $r_{12}$ respectively, and radii of curvature $R_{4f1}$, $R_{4f2}$, $R_{4f3}$ and $R_{4f4}$ of the fourth lens unit are $r_{17}$, $r_{18}$, $r_{19}$ and $r_{20}$ respectively. Accordingly, $R_{411}=R_{4f1}=r_{17}$ and $R_{412}=R_{4f2}=r_{18}$, thereby satisfying the condition (1) as shown in the numerical data.

The fourth lens unit G4 consists of a negative lens component and a positive lens component which have focal lengths $f_{41}$ and $f_{42}$ ($f_s$) shown in the numerical data and satisfying the condition (2).

In the fourth embodiment, $r_{12}$ and $r_{13}$ are aspherical surfaces.

In FIG. 4, a reference symbol S represents a stop, and a reference symbol P designates filters such as an infrared cut filter, an optical low pass filter and the lice.

Figure 5:
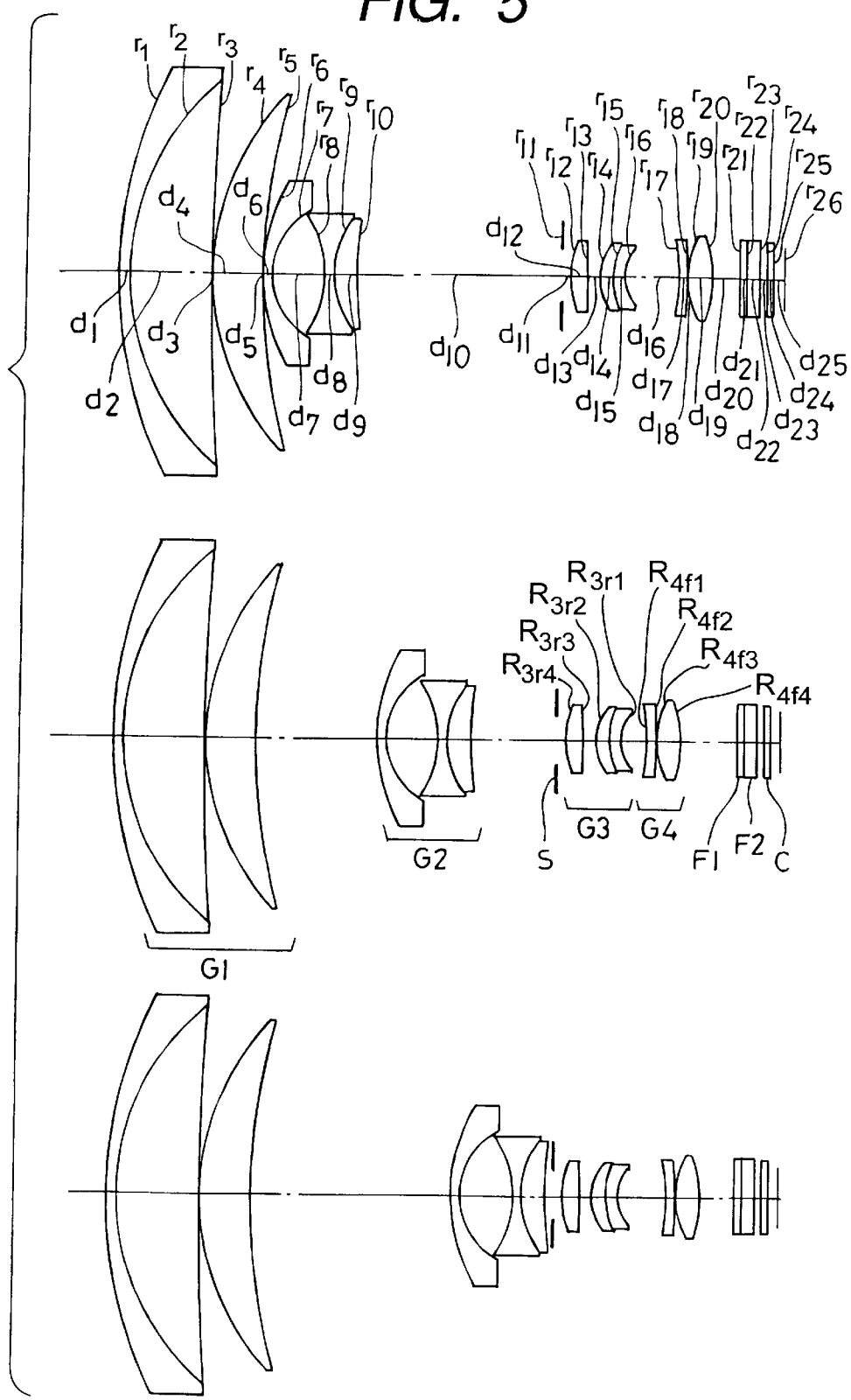
FIG. 5 is a sectional view showing a composition of a fifth embodiment of the present invention.

The fifth embodiment is a zoom optical system having a composition which is similar to that of the first embodiment as shown in FIG. 5. Accordingly, radii of curvature $R_{3r1}$, $R_{3r2}$, $R_{3r3}$ and $R_{3r4}$ of a third lens unit G3 are $r_{16}$, $r_{14}$, $r_{13}$ and $r_{12}$ respectively, and radii of curvature $R_{4f1}$, $R_{4f2}$, $R_{4f3}$ and $R_{4f4}$ or a fourth lens unit G4 are $r_{17}$, $r_{18}$, $r_{19}$ and $R_{20}$ respectively.

Furthermore, $R_{411}=R_{4f1}=r_{17}$ and $R_{412}=R_{4f2}=r_{10}$, thereby satisfying the condition (1) as listed in the numerical data. Furthermore, lens components of the fourth lens unit G4 have focal lengths $f_{41}$ and $f_{42}$ which are listed in the numerical data and satisfy the condition (2).

In the optical system according to the fifth embodiment, surfaces $r_{12}$ and $r_{13}$ are aspherical surfaces.

In FIG. 5, a reference symbol S represents a stop, a reference symbol F1 designates an infrared cut filter, a reference symbol F2 denotes an optical low pass filter and a reference symbol C represents a cover glass plate.

Figure 6:
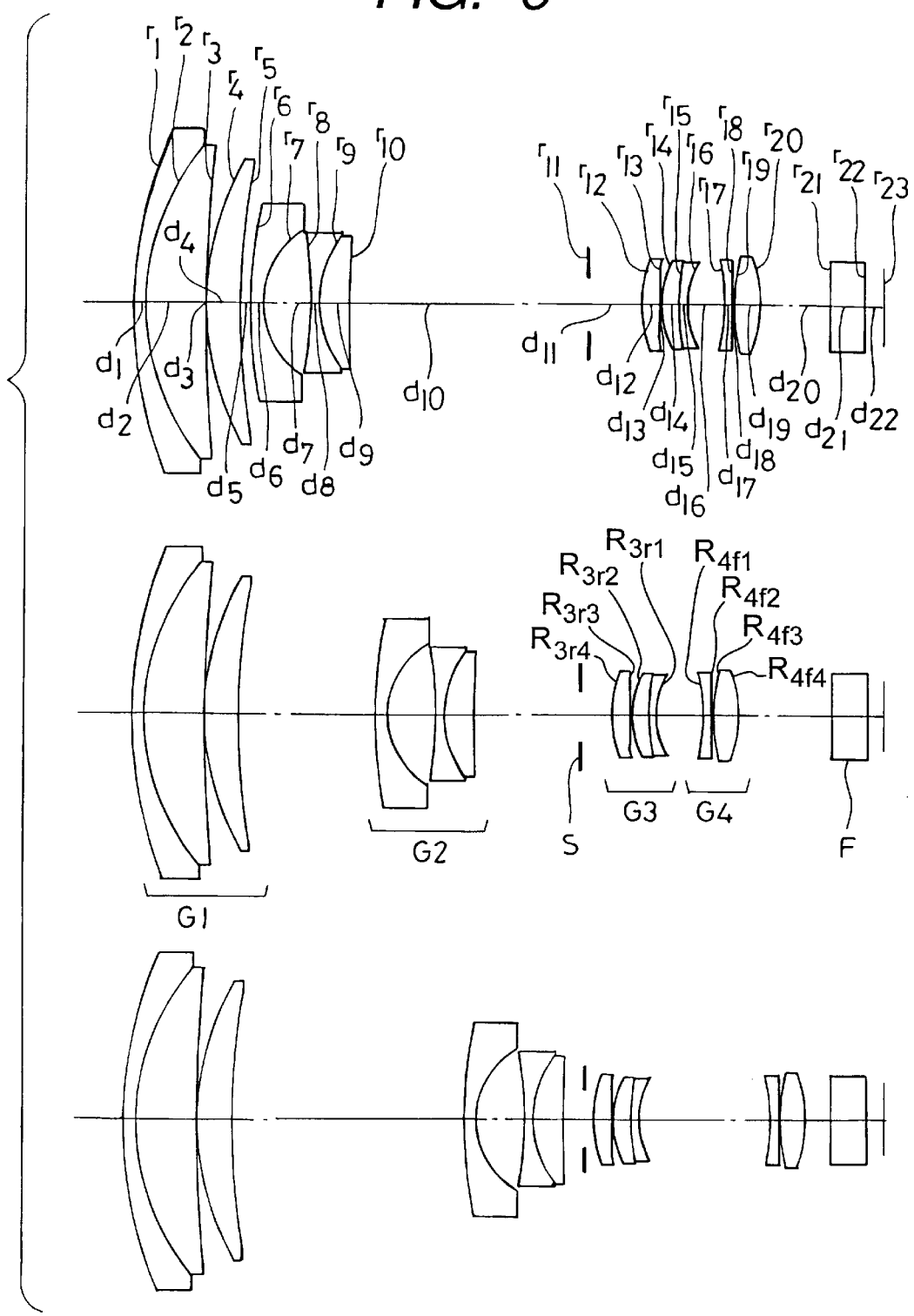
FIG. 6 is a sectional view showing a composition of a sixth embodiment of the present invention.

The sixth embodiment has a composition shown in FIG. 6 and is an optical system similar to the first embodiment.

Accordingly, radii of curvature $R_{3r1}$, $R_{3r2}$, $R_{3r3}$ and $R_{3r4}$ of a third lens unit G3 are $r_{16}$, $r_{14}$, $r_{13}$ and $r_{12}$ respectively, and radii of curvature $R_{4f1}$, $R_{4f2}$, $R_{4f3}$ and $R_{4f4}$ of a fourth lens unit G4 are $r_{17}$, $r_{18}$, $r_{19}$ and $r_{20}$ respectively. Accordingly, $R_{411}=R_{4f1}=r_{17}$ and $R_{412}=R_{4f2}=r_{18}$, thereby satisfying the condition (1) as shown in the numerical data.

Furthermore, lens components of the fourth lens unit G4 have focal lengths $f_{41}$, $f_{42}$ and $f_{43}$ ($f_s$) which are listed in the numerical data and satisfy the condition (2).

In the optical system according to the sixth embodiment, surfaces $r_{12}$, $r_{13}$, $r_{19}$ and $r_{20}$ are aspherical surfaces In FIG. 6, a reference symbol S represents a stop, and a reference symbol F designates filters such as an infrared cut filter, an optical low pass filter and the like.

Figure 7:
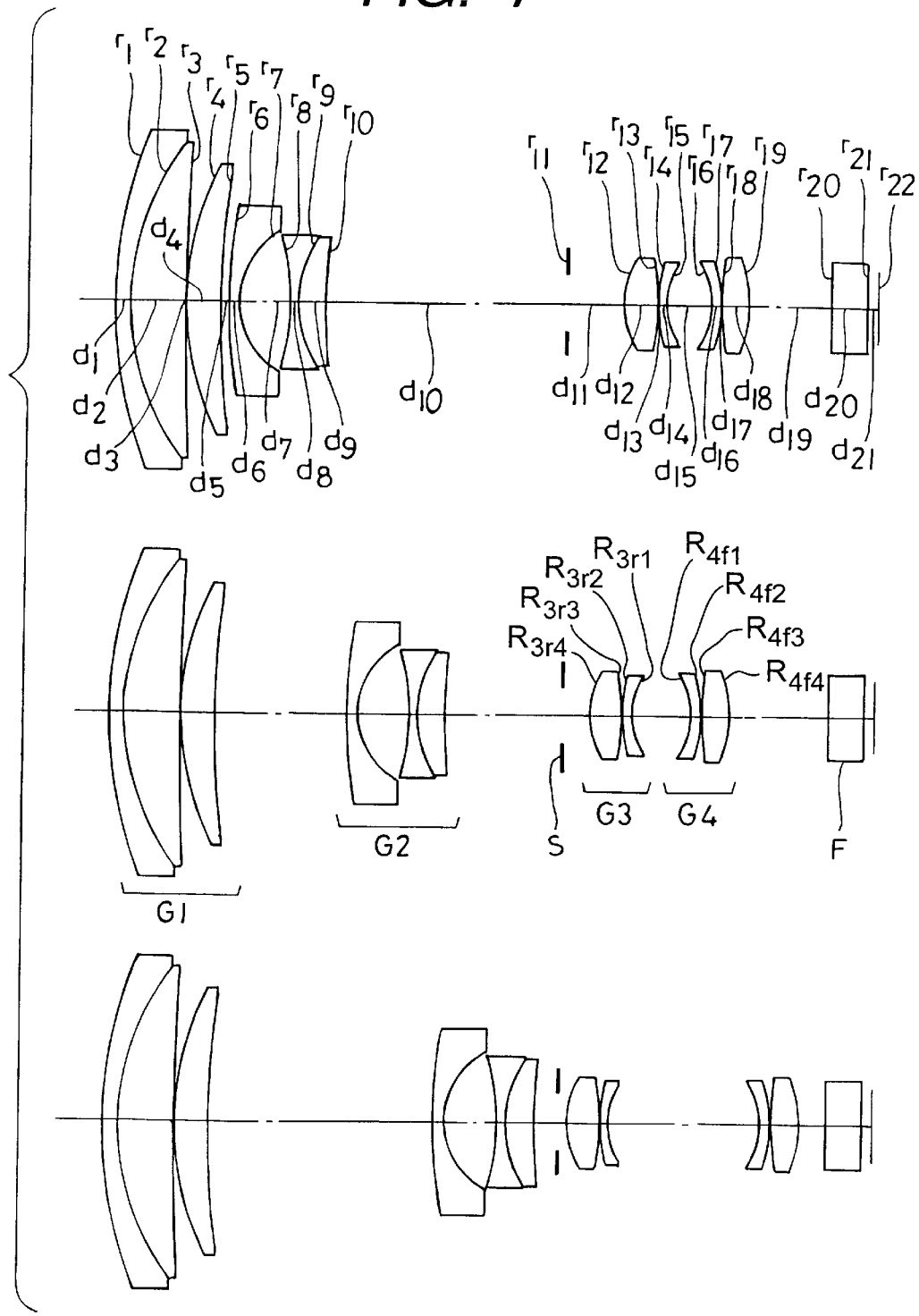
FIG. 7 is a sectional view showing a composition of a seventh embodiment of the present invention.

The seventh embodiment is an optical system shown in FIG. 7.

Different from the other embodiment, the seventh embodiment uses a third lens unit G3 which consists of a positive lens element and a single negative lens element, and a fourth lens unit G4 which consists of a single negative lens element and a single positive lens element. Accordingly, each of a rear subunit of the third lens unit and a front subunit of the fourth lens unit is a single negative meniscus lens element.

In the seventh embodiment, radii of curvature $R_{3r1}$, $R_{3r2}$, $R_{3r3}$ and $R_{3r4}$ of the third lens unit G3 are $r_{15}$, $r_{14}$, $r_{13}$ and $r_{12}$ respectively, and radii of curvature $R_{4f1}$, $R_{4f2}$, $R_{4f3}$ and $R_{4f4}$ of the fourth lens unit G4 are $r_{16}$, $r_{17}$, $r_{18}$ and $r_{19}$ respectively.

Accordingly, $R_{411}=R_{4f1}=r_{18}$ and $R_{412}=R_{4f2}=r_{17}$, thereby satisfying the condition (1) as shown in the numerical data.

In the seventh embodiment, $r_{12}$, $r_{13}$, $r_{18}$ and $r_{19}$ are aspherical surfaces.

In FIG. 7, a reference symbol S represents a stop, and a reference symbol F designates filters such as an infrared cut filter, an optical low pass filter and the like.

Figure 8:
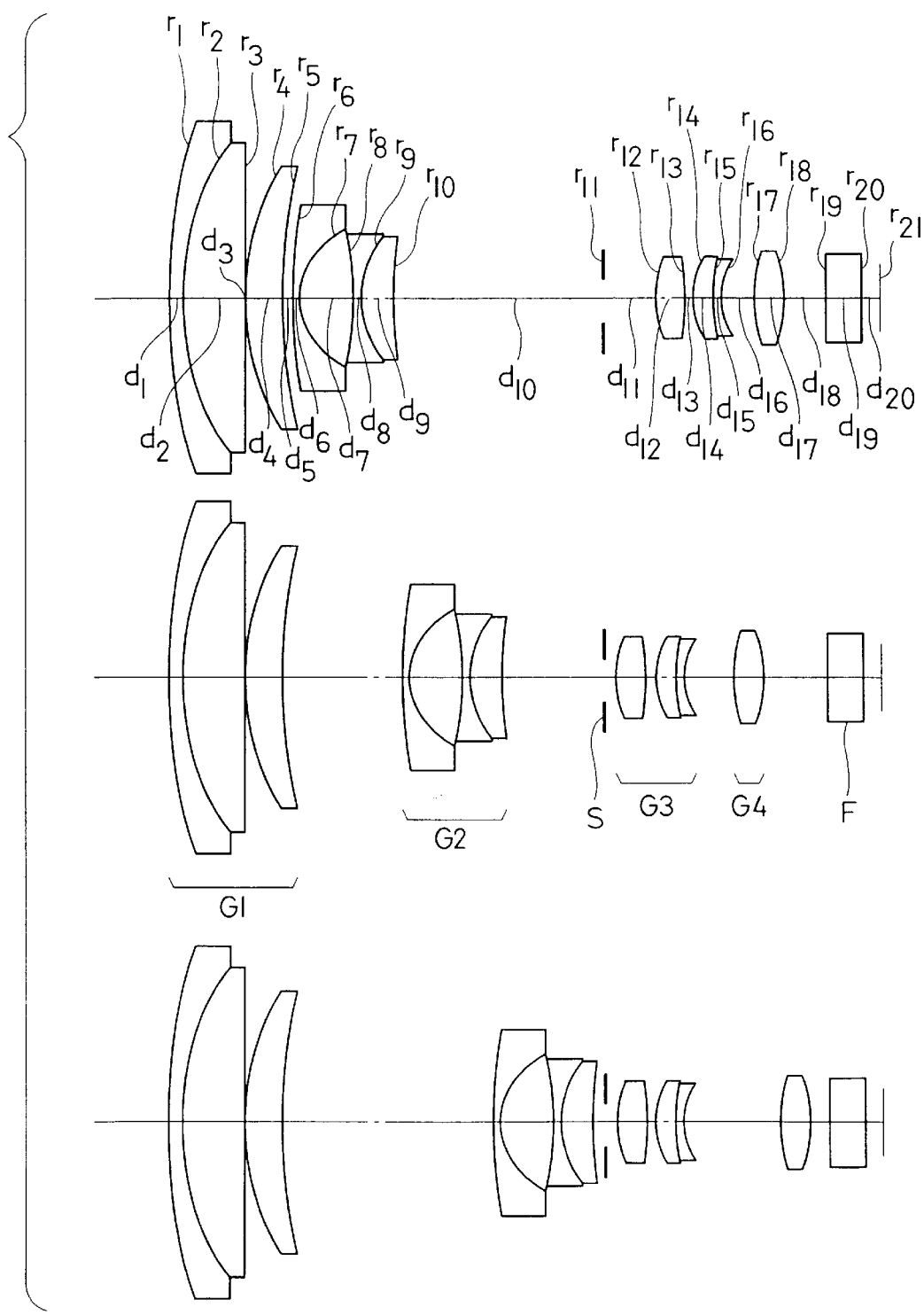
FIG. 8 is a sectional view showing a composition of an eighth embodiment of the present invention.

The eighth embodiment has a composition shown in FIG. 8 which is similar to that of the second embodiment. That is, the zoom lens system according to the eighth embodiment comprises, in order from the object side, a first lens unit G1 having positive refractive power, a second lens unit G2 having negative refractive power, a third lens unit G3 having positive refractive power and a fourth lens unit G4 having positive refractive power, and moves at least the second lens unit G2 and the fourth lens unit G4 along an optical axis to change a magnification. Furthermore, the first lens unit G1 consists of a cemented lens component consisting of a negative lens element and a positive lens element, and a positive lens component, the second lens unit G2 consists of a negative lens component, and a cemented lens component consisting of a negative lens element and a positive lens element, the third lens unit G3 consists of a positive lens component, and a cemented lens component consisting of a positive lens element and a negative lens element, and the fourth lens unit consists of an aspherical lens element having two aspherical surfaces. That is, the eighth embodiment is a zoom lens system which has the fourth composition according to the present invention in which the fourth lens unit G4 consists of the aspherical lens element having the two aspherical surfaces, out of which an object side aspherical surface changes refractive power in a negative direction as portions of the aspherical surface are farther from the optical axis toward a margin.

In the eighth embodiment, $R_{411}$ and $R_{412}$ correspond to $r_{17}$ and $r_{18}$, and satisfy the conditions (1) and (2). Furthermore, $r_{12}$, $r_{17}$ and $r_{18}$ are aspherical surfaces in the eighth embodiment.

In FIG. 8, a reference symbol S represents a stop, and a reference symbol F designates filters such as an infrared cut filter, an optical low pass filter and the like.

Shapes of the aspherical surfaces used in the above described embodiments are expressed by the following formula:

$$x=(y^2/r)/[1+(1(1+k)(y/r)^2)^{1/2}]+A_4y^4+A_6y^6+A_8y^8+A_{10}y^{10}$$

wherein a light travelling direction along an optical axis is taken as an x axis, a direction perpendicular to the optical axis is taken as a y axis, a reference symbol r represents a radius of curvature on a reference sphere, a reference symbol k designates a conical coefficient, and reference symbols $A_4$, $A_6$, $A_8$ and $A_{10}$ denotes aspherical surface coefficients.

In FIG. 1 through FIG. 8 which are sectional views of the embodiments, an upper stage corresponds to a wide position a middle stage corresponds to an intermediate focal length and a lower stage corresponds to a tele position.

Figure 11:
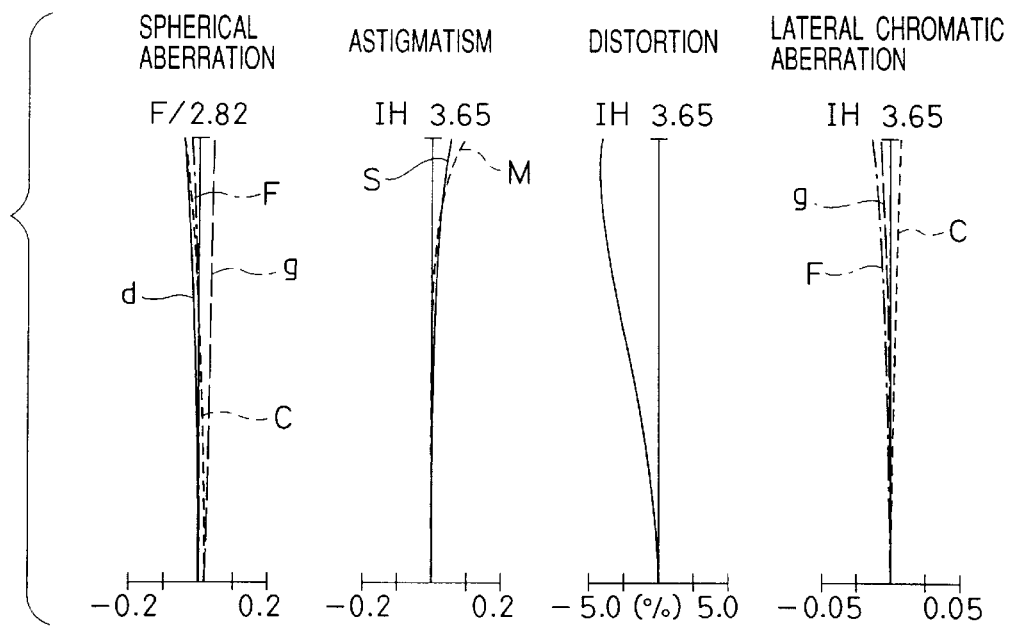
FIG. 11 shows curves illustrating aberration characteristics at a wide position of the eighth embodiment of the present invention.
Figure 12:
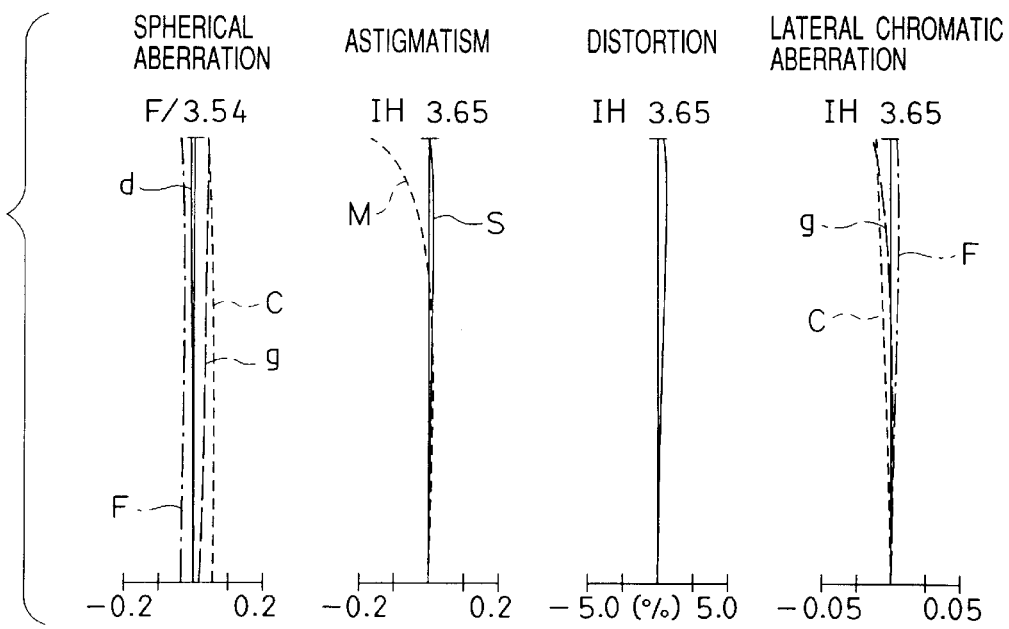
FIG. 12 shows curves illustrating aberration characteristics at a tele position of the eighth embodiment of the present invention.

FIG. 9 and FIG. 10 show aberration characteristics of the first embodiment. FIG. 9 showing aberration conditions at the wide position and FIG. 10 showing aberration conditions at the tele position, and FIG. 11 and FIG. 12 show aberration characteristics of the eighth embodiment; FIG. 11 showing aberrations at the wide position and FIG. 12 showing aberration conditions at the tele position.

As seen from aberration curves, aberrations are corrected favorably in the zoom image pickup optical systems according to the first and eighth embodiments Aberrations are corrected favorably also in the other second through seventh embodiments.

The present invention makes it possible to realize a compact optical system which is applicable to an image pickup device having a large number of small picture elements and provides a high quality image.

What is claimed is:

1. A zoom image pickup optical system comprising in order from an object side:

a first lens unit having positive refractive power;

a second lens unit having negative refractive power;

a third lens unit having positive refractive power; and a fourth lens unit having positive refractive power, wherein at least the second lens unit and the fourth lens unit are moved along an optical axis to change a magnification, wherein said third lens unit comprises at least two lens components, wherein said fourth lens unit comprises at least two lens components, and wherein $R_{3r1}$ has a sign different from that of $R_{4f1}$, $R_{3r2}$ has a sign different from that of $R_{4f2}$, $R_{313}$ has a sign different from that of $R_{4f3}$, and $R_{3r4}$ has a sign different from that of $R_{4f4}$ when a radius of curvature on an image side surface and a radius of curvature on an object side surface of a most image side lens component of the third lens unit are represented by $R_{3r1}$ and $R_{3r2}$ respectively, a radius of curvature on an image side surface and a radius of curvature on an object side surface of a lens component which is adjacent to said most image side lens component with an airspace interposed are designated by $R_{3r3}$ and $R_{3r4}$ respectively, radii or curvature on an object side surface and an image side surface of a most object side lens component of said fourth lens unit are denoted by $R_{4f1}$ and $R_{4f2}$ respectively, and radii of curvature on an object side surface and an image side surface of a lens component which is adjacent to said most object side lens component with an airspace interposed are represented by $R_{4f3}$ and $R_{4f4}$ respectively.

2. A zoom image pickup optical system comprising in order from an object side: a first lens unit having positive refractive power; a second lens unit having negative refractive power; a third lens unit having positive refractive power; and a fourth lens unit having positive refractive power, wherein the second lens unit and the fourth lens unit are moved along an optical axis to change a magnification, wherein said third lens unit consists of a front subunit and a rear subunit in order from the object side, wherein said fourth lens unit consists of a front subunit and a rear subunit in order from the object side, wherein the rear subunit of said third lens unit is a lens component, the front subunit of said fourth lens unit is a lens component and said lens components of said rear subunit of said third lens unit and said front subunit of said fourth lens unit have concave surfaces opposed to each other, wherein either of the rear subunit of said third lens unit or the front subunit of said fourth lens unit is a meniscus cemented lens component, or a cemented lens component having negative refractive power or a meniscus lens component consisting of a single lens element having negative refractive power, and wherein a radius of curvature $R_{3r1}$ of an image side surface of the lens component used as the rear subunit of the third lens unit has a sign different from that of a radius of curvature $R_{4f1}$ of an object side surface of the lens component used as the front subunit of the fourth lens unit, a radius of curvature $R_{3r2}$ of an object side surface of the lens component used as the rear subunit of the third lens unit has a sign different from that of a radius of curvature $R_{4f2}$ of an image side surface of the lens component used as the front subunit of the fourth lens unit.

3. A zoom image pickup optical system comprising in order from an object side: a first lens unit having positive refractive power; a second lens unit having negative refractive power; a third lens unit having positive refractive power; and a fourth lens unit having positive refractive power, wherein at least the second lens unit and the fourth lens unit are moved along an optical axis to change a magnification, wherein said third lens unit comprises at least two lens components, wherein said fourth lens unit consists, in order from the object side, of a front subunit consisting of a lens component having a concave surface on the object side and a rear subunit comprising a lens component, and wherein said fourth lens unit consists of four or fewer lens elements, and wherein the front subunit of said fourth lens unit consists of a meniscus cemented lens component, or a cemented lens component having negative refractive power or a single negative meniscus lens element.

4. A zoom image pickup optical system comprising in order from an object side: a first lens unit having positive refractive power; a second lens unit having negative refractive power; a third lens unit having positive refractive power; and fourth lens unit having positive refractive power, wherein at least the second lens unit and the fourth lens unit are moved along an optical axis to change a magnification, and wherein said fourth lens unit consists of an aspherical lens element having two aspherical surfaces, out of which an object side surface changes refractive power in a negative direction as portions of the object side surface are farther from the optical axis toward a margin.

5. A zoom image pickup optical system comprising in order from an object side:
   a first lens unit having positive refractive power;
   a second lens unit having negative refractive power;
   a third lens unit having positive refractive power; and
   a fourth lens unit having positive refractive power,
   wherein at least the second lens unit and the fourth lens unit are moved along an optical axis to change a magnification, and
   wherein each of said first, second, third and fourth lens units includes at least one optical element having optical power, and none of said optical elements having optical power has a refractive index less than 1.6.

6. The zoom image pickup optical system according to claim 1, wherein a surface of the third lens unit and a surface of the fourth lens unit which are opposed to each other are concave surfaces.

7. The zoom image pickup optical system according to claim 1 or 6, wherein each lens element of the fourth lens unit satisfies the following condition (2):

$$0.01 < |(f_4/f_{4s})| < 5 \tag{2}$$

wherein a reference symbol $f_4$ represents a focal length of the fourth lens unit, a reference symbol $f_{4s}$ designates a focal length of each lens element of the fourth lens unit and a reference symbol s denotes an ordinal number of a lens element as counted from the object side.

8. The zoom image pickup optical system according to claim 1 or 6, satisfying the following condition (1):

$$0.01 < |(R_{411}/R_{412})| - 1 \tag{1}$$

wherein a reference symbol $R_{411}$ represents a radius of curvature on an object side surface of a most object side lens element of said fourth lens unit and a reference symbol $R_{412}$ designates a radius of curvature on an image side surface of the most object side lens element or the fourth lens unit.

9. The zoom image pickup optical system according to claim 8, wherein at least either the rear subunit of the third lens unit or the front subunit of the fourth lens unit has negative refractive power.

10. The zoom image pickup optical system according to claim 8, at least either the front subunit of the third lens unit or the rear subunit of the fourth lens unit has positive refractive power.

11. The zoom image pickup optical system according to claim 10, wherein the front subunit of the third ions unit or the rear subunit of the fourth lens unit which has positive refractive power is a single biconvex lens element.

12. The zoom image pickup optical system according to claim 11, wherein said single biconvex lens element has an aspherical surface.

13. The zoom image pickup optical system according to claim 12, wherein said single biconvex lens element has two aspherical surfaces.

14. The zoom image pickup optical system according to claim 2, wherein the front subunit of the fourth lens unit has negative refractive power.

15. The zoom image pickup optical system according to claim 2 or 14, wherein the rear subunit of the fourth lens unit has positive refractive power.

16. The zoom image pickup optical system according to claim 15, wherein the rear subunit of the fourth lens unit is a single biconvex lens element.

17. The zoom image pickup optical system according to claim 16, wherein said single biconvex lens element has an aspherical surface.

18. The zoom image pickup optical system according to claim 17, wherein said single biconvex lens element has two aspherical surfaces.

19. The zoom image pickup optical system according to claim 1, 2, 3, 4, 5, 6 or 14, wherein the positive first lens unit is kept stationary during focusing.

20. The zoom image pickup optical system according to claim 1, 2, 3, 4, 5, 6 or 14, wherein the first lens unit is kept stationary during a magnification change.

21. The zoom image pickup optical system according to claim 1, 2, 3, 4, 5, 6 or 14, wherein the third lens unit is moved to change a magnification.

22. The zoom image pickup optical system according to claim 1, 2, 3, 4, 5, 6 or 14, wherein the fourth lens unit is moved along a locus convex on the object side to change a magnification.

23. The zoom image pickup optical system according to claim 1, 2, 3, 4, 5, 6 or 14, wherein said fourth lens unit is moved for focusing.

24. The zoom image pickup optical system according to claim 1, 2, 3, 4, 5, 6 or 14, comprising a stop fixed at a location.

25. The zoom image pickup optical system according to claim 1, 2, 3, 4, 5, 6 or 14 having a zoom ratio of 5 or higher.

* * * * *